US011711352B2

(12) United States Patent
Singh

(10) Patent No.: US 11,711,352 B2
(45) Date of Patent: Jul. 25, 2023

(54) SYSTEMS AND METHODS TO PREVENT PRIVATE DATA MISUSE BY INSIDER

(71) Applicant: Citrix Systems, Inc., Fort Lauderdale, FL (US)

(72) Inventor: Manbinder Pal Singh, Coral Springs, FL (US)

(73) Assignee: Citrix Systems, Inc., Fort Lauderdale, FL (US)

( * ) Notice: Subject to any disclaimer, the term of this patent is extended or adjusted under 35 U.S.C. 154(b) by 309 days.

(21) Appl. No.: 17/125,266

(22) Filed: Dec. 17, 2020

(65) Prior Publication Data

US 2022/0200977 A1    Jun. 23, 2022

(51) Int. Cl.
*H04L 9/40* (2022.01)

(52) U.S. Cl.
CPC .......... *H04L 63/08* (2013.01); *H04L 63/0428* (2013.01)

(58) Field of Classification Search
CPC ............................. H04L 63/08; H04L 63/0428
USPC ........................................................ 726/28
See application file for complete search history.

(56) References Cited

U.S. PATENT DOCUMENTS

| | | | | |
|---|---|---|---|---|
| 7,822,821 | B2* | 10/2010 | Foote | H04L 51/04 709/204 |
| 11,314,832 | B1* | 4/2022 | Unger | G06F 16/9538 |
| 2009/0019553 | A1* | 1/2009 | Narayanaswami | H04L 63/10 726/28 |
| 2009/0135444 | A1* | 5/2009 | Best | G06F 21/6245 358/1.15 |
| 2011/0295988 | A1* | 12/2011 | Le Jouan | G06F 21/6254 709/223 |
| 2015/0163201 | A1* | 6/2015 | Call | H04L 63/0281 726/3 |
| 2020/0353839 | A1* | 11/2020 | Tarchinski | B60L 58/12 |

* cited by examiner

*Primary Examiner* — Dant B Shaifer Harriman

(57) ABSTRACT

Described embodiments provide systems and methods for protecting private data or confidential information. A device can receive a request from a client for a page from a server that includes confidential information to be verified with an owner of the confidential information. The device may be intermediary between the client and the server. Prior to providing the page to the client for rendering, the device may replace a first user interface (UI) element having the confidential information in the page, with a second UI element to obfuscate the confidential information. The device may receive an activation of the second UI element to request the owner to verify the confidential information from the client. The device may send to the client an update to the page to include an indication of whether the confidential information has been correctly verified with the owner.

18 Claims, 10 Drawing Sheets

Page 304 (e.g., Account information) 300

Account name: user2

Account e-mail: user2@secret.com

Confidential information 306 (e.g., SSN): *****4835

Account identification: 2021

Enrollment status: disabled

Notes:

Edit account

FIG. 3

Page 304 (e.g., Account information) 400

Account name: user2

Account e-mail: user2@secret.com

Confidential information 306 (e.g., SSN): Verify Account SSN — Second UI element 308(2)

Account identification: 2021

Enrollment status: disabled

Notes:

Edit account

Verify confidential information

Enter the confidential information 306 (e.g., last four digits of social security number)

Confidential information 306:    *Last four digits*

FIG. 5

SYSTEMS AND METHODS TO PREVENT PRIVATE DATA MISUSE BY INSIDER

FIELD OF THE DISCLOSURE

The present application generally relates to protecting private data, including but not limited to systems and methods for preventing private data misuse by an insider.

BACKGROUND

Certain scenarios may require providing sensitive or private information to another entity. A customer representative (e.g., an insider of the system/process), for example, can obtain or acquire sensitive information via a resource. In some instances, the customer representative may use the sensitive information in an improper manner, such as using the sensitive information for personal financial gain. Using the sensitive information in an improper manner can result in private data misuse. Failing to implement or enable adequate protective mechanisms for the private date can increase the accessibility to the sensitive information. The increased accessibility to the sensitive information can cause the information to be mishandled by another entity.

SUMMARY

This Summary is provided to introduce a selection of concepts in a simplified form that are further described below in the Detailed Description. This Summary is not intended to identify key features or essential features, nor is it intended to limit the scope of the claims included herewith.

The present disclosure is directed towards systems and methods for protecting private data or confidential/sensitive information. The systems and methods described herein can transform/morph/modify/alter/obfuscate/hide confidential information (e.g., a social security number (SSN), a date of birth (DoB) and/or other confidential information) included in a page (e.g., a web page, a web application, a software as a service (SaaS) application, and/or other pages) to protect/secure the confidential information. For instance, a user of a client (e.g., a smartphone, a laptop, a tablet device, a desktop computer of a user, and/or a client supporting HTTP/HTTPS for instance) may have access to confidential information included in a page of a server (e.g., a backend server supporting hypertext transfer protocol (HTTP) and/or hypertext transfer protocol secure (HTTPS)). However, in some embodiments, the user of the client/page (e.g., a customer representative) may not be an owner of the confidential information.

To protect/secure the confidential information, a device (e.g., a gateway module, a local/foreign node, and/or an application delivery controller (ADC)) intermediary between the client and the server may transform/modify/hide/obfuscate the confidential information of the page. Responsive to transforming/obfuscating the confidential information, the device may cause or trigger a request to the owner of the confidential information (e.g., via an out-of-band verification process and/or other processes). The request may include a request to verify/confirm/authenticate the confidential information. For example, the device may send/transmit/initiate a push notification (e.g., request to verify the confidential information) to the owner of the confidential information. If the owner receives/obtains the push notification, the owner may confirm/authenticate the confidential information. By transforming/obfuscating the confidential information of the page from being exposed to the user of the client/page, the systems and methods described herein can protect the confidential information (e.g., included in the page) from being misused while enabling verification/confirmation/authentication of the confidential information (e.g., by the owner of the confidential information).

In one aspect, the present disclosure is directed to a method for preventing private data misuse. The method can include receiving, by a device intermediary between a client and a server, a request from the client for a page from the server that includes confidential information to be verified with an owner of the confidential information. Prior to providing the page to the client for rendering, the device may replace a first user interface (UI) element having the confidential information in the page, with a second UI element to obfuscate the confidential information. The device may receive an activation of the second UI element to request the owner to verify the confidential information from the client. The device may send to the client an update to the page to include an indication of whether the confidential information has been correctly verified with the owner.

In some embodiments, the request may be initiated by a user of the client in a communication session with the owner. The request may be initiated to verify the confidential information with the owner in the communication session. In certain embodiments, the device may determine that the page from the server includes the confidential information, according to at least one of: application of at least one rule, identification of the first UI element, or an output of a data loss prevention (DLP) system. The device may store the confidential information from the page. The device may compare the stored confidential information with verification information obtained from the owner. According to the comparing, the device may determine whether the confidential information has been correctly verified with the owner.

In certain embodiments, the device may send the page with the second UI element to the client. The device may send the page for display to a user of the client. The second UI element may comprise a button or widget that can be activated by the user of the client. Responsive to receiving the activation of the second UI element, the device may initiate a one-time verification message to the owner, a push notification to the owner, a representational state transfer (REST) call to a verification service, or a prompt to the owner/client to select a method to verify the confidential information. In some embodiments, the device may send a message to the client. The device may send a message to update the second UI element or another element of the page to include the indication of whether the confidential information has been correctly verified with the owner.

In some embodiments, prior to providing the page to the client for display, the device may replace a third UI element having additional confidential information in the page, with a fourth UI element. The device may replace the third UI element with the fourth UI element to obfuscate the additional confidential information. The device may receive an activation of the fourth UI element from the client. The device may receive the activation of the fourth UI element to request the owner to verify the additional confidential information. The device may send an update to the page to the client. The device may send an update to the page to include an indication of whether the additional confidential information has been correctly verified with the owner. In some embodiments, at least one of: the confidential information, or a type of the confidential information, may be prevented from being exposed or presented to a user of the client.

In one aspect, the present disclosure is directed to a device for preventing private data misuse. The device may comprise at least one processor. The at least one processor may be configured to receive a request from the client for a page from the server that includes confidential information to be verified with an owner of the confidential information. Prior to providing the page to the client for rendering, the at least one processor may be configured to replace a first user interface (UI) element having the confidential information in the page, with a second UI element. The at least one processor may be configured to replace the first UI element with the second UI element to obfuscate the confidential information. The at least one processor may be configured to receive, from the client, an activation of the second UI element to request the owner to verify the confidential information. The at least one processor may be configured to send, to the client, an update to the page to include an indication of whether the confidential information has been correctly verified with the owner In some embodiments, the request may be initiated by a user of the client in a communication session with the owner. The request may be initiated to verify the confidential information with the owner in the communication session. In certain embodiments, the at least one processor may be configured to determine that the page from the server includes the confidential information, according to at least one of: application of at least one rule, identification of the first UI element, or an output of a data loss prevention (DLP) system. The at least one processor may be configured to store the confidential information from the page. The at least one processor may be configured to compare the stored confidential information with verification information obtained from the owner. According to the comparing, the at least one processor may be configured to determine whether the confidential information has been correctly verified with the owner.

In certain embodiments, the at least one processor may be configured to send the page with the second UI element to the client. The at least one processor may be configured to send the page for display to a user of the client. The second UI element may comprise a button or widget that can be activated by the user of the client. Responsive to receiving the activation of the second UI element, the at least one processor may be configured to initiate a one-time verification message to the owner, a push notification to the owner, a representational state transfer (REST) call to a verification service, or a prompt to the owner/client to select a method to verify the confidential information. In some embodiments, the at least one processor may be configured to send a message to the client. The at least one processor may be configured to send a message to update the second UI element or another element of the page to include the indication of whether the confidential information has been correctly verified with the owner.

In some embodiments, prior to providing the page to the client for rendering, the at least one processor may be configured to replace a third UI element having additional confidential information in the page, with a fourth UI element. The at least one processor may be configured to replace the third UI element with the fourth UI element to obfuscate the additional confidential information. The at least one processor may be configured to receive an activation of the fourth UI element from the client. The at least one processor may be configured to receive the activation of the fourth UI element to request the owner to verify the additional confidential information. The at least one processor may be configured to send an update to the page to the client. The at least one processor may be configured to send the update to the page to include an indication of whether the additional confidential information has been correctly verified with the owner. In some embodiments, at least one of: the confidential information, or a type of the confidential information, may be prevented from being exposed or presented to a user of the client.

In one aspect, the present disclosure is directed to a non-transitory computer readable medium storing program instructions for preventing private data misuse. The program instructions stored in a non-transitory computer readable medium may cause at least one processor of a device (e.g., a device intermediary between a client and a server) to receive a request from the client for a page from the server. The page from the server may include confidential information to be verified with an owner of the confidential information. Prior to providing the page to the client for rendering, the program instructions can cause the at least one processor to replace a first user interface (UI) element having the confidential information in the page, with a second UI element. The program instructions may cause the at least one processor to replace the first user UI element with the second UI element to obfuscate the confidential information. The program instructions may cause the at least one processor to receive from the client, an activation of the second UI element to request the owner to verify the confidential information. The program instructions may cause the at least one processor to send, to the client, an update to the page to include an indication of whether the confidential information has been correctly verified with the owner.

Responsive to receiving the activation of the second UI element, the program instructions may cause the at least one processor to initiate a one-time verification message to the owner or a push notification to the owner. Responsive to receiving the activation of the second UI element, the program instructions may cause the at least one processor to initiate a representational state transfer (REST) call to a verification service or a prompt to the owner/client to select a method to verify the confidential information.

BRIEF DESCRIPTION OF THE DRAWING FIGURES

Objects, aspects, features, and advantages of embodiments disclosed herein will become more fully apparent from the following detailed description, the appended claims, and the accompanying drawing figures in which like reference numerals identify similar or identical elements. Reference numerals that are introduced in the specification in association with a drawing figure may be repeated in one or more subsequent figures without additional description in the specification in order to provide context for other features, and not every element may be labeled in every figure. The drawing figures are not necessarily to scale, emphasis instead being placed upon illustrating embodiments, principles and concepts. The drawings are not intended to limit the scope of the claims included herewith.

FIG. 3 is a depiction of a page including confidential information, in accordance with an illustrative embodiment;

FIG. 4 is a depiction of a page with obfuscated confidential information, in accordance with an illustrative embodiment;

FIG. 5 is a depiction of a message, notification, or prompt to verify the confidential information, in accordance with an illustrative embodiment;

DETAILED DESCRIPTION

For purposes of reading the description of the various embodiments below, the following descriptions of the sections of the specification and their respective contents may be helpful:

Section A describes a network environment and computing environment which may be useful for practicing embodiments described herein;

Section B describes embodiments of systems and methods for delivering a computing environment to a remote user;

Section C describes embodiments of systems and methods for protecting confidential information.

A. Network and Computing Environment

Figure 1A:
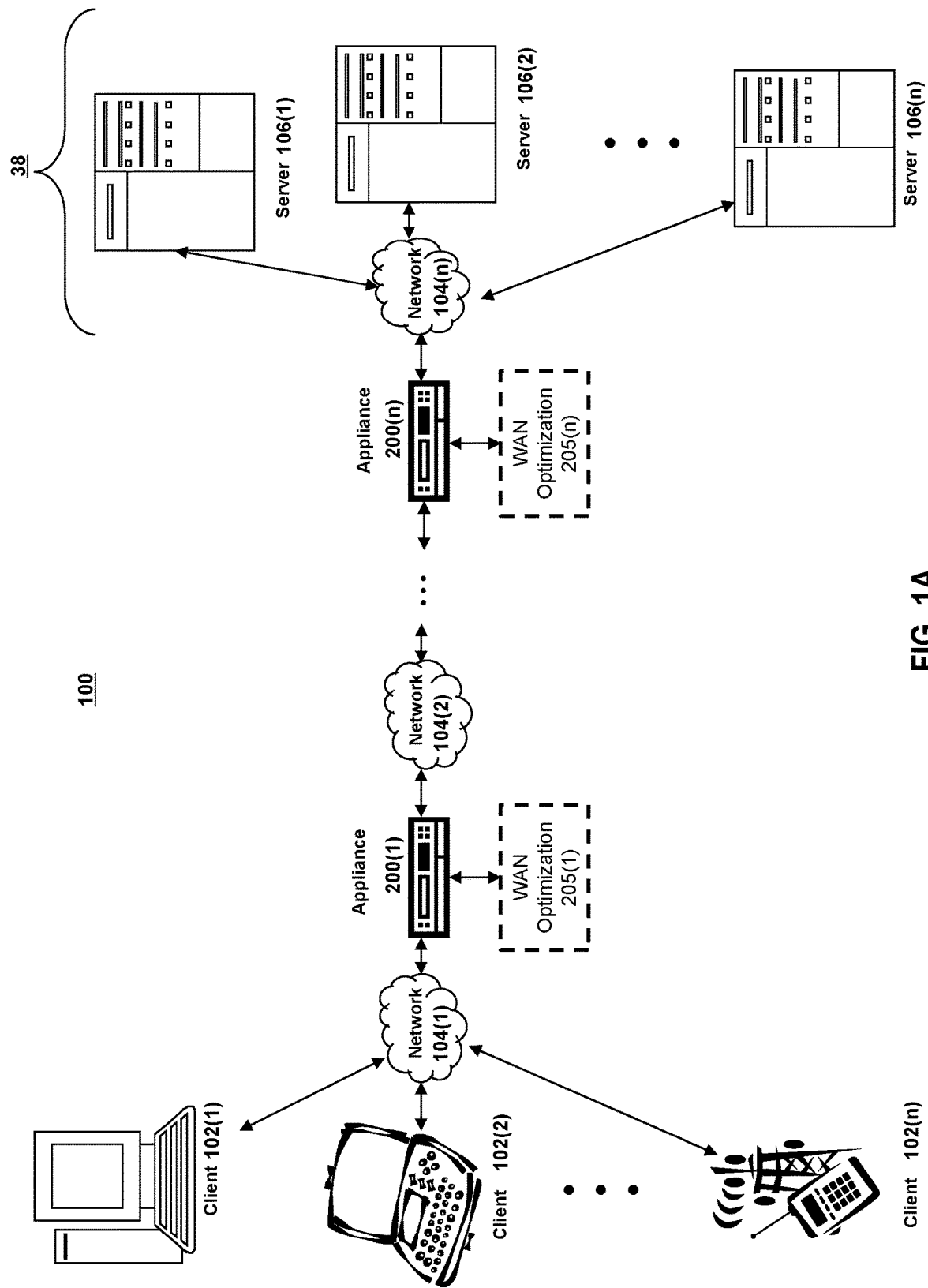
FIG. 1A is a block diagram of a network computing system, in accordance with an illustrative embodiment.

Referring to FIG. 1A, an illustrative network environment 100 is depicted. Network environment 100 may include one or more clients 102(1)-102(n) (also generally referred to as local machine(s) 102 or client(s) 102) in communication with one or more servers 106(1)-106(n) (also generally referred to as remote machine(s) 106 or server(s) 106) via one or more networks 104(1)-104n (generally referred to as network(s) 104). In some embodiments, a client 102 may communicate with a server 106 via one or more appliances 200(1)-200n (generally referred to as appliance(s) 200 or gateway(s) 200).

Although the embodiment shown in FIG. 1A shows one or more networks 104 between clients 102 and servers 106, in other embodiments, clients 102 and servers 106 may be on the same network 104. The various networks 104 may be the same type of network or different types of networks. For example, in some embodiments, network 104(1) may be a private network such as a local area network (LAN) or a company Intranet, while network 104(2) and/or network 104(n) may be a public network, such as a wide area network (WAN) or the Internet. In other embodiments, both network 104(1) and network 104(n) may be private networks. Networks 104 may employ one or more types of physical networks and/or network topologies, such as wired and/or wireless networks, and may employ one or more communication transport protocols, such as transmission control protocol (TCP), internet protocol (IP), user datagram protocol (UDP) or other similar protocols.

As shown in FIG. 1A, one or more appliances 200 may be located at various points or in various communication paths of network environment 100. For example, appliance 200 may be deployed between two networks 104(1) and 104(2), and appliances 200 may communicate with one another to work in conjunction to, for example, accelerate network traffic between clients 102 and servers 106. In other embodiments, the appliance 200 may be located on a network 104. For example, appliance 200 may be implemented as part of one of clients 102 and/or servers 106. In an embodiment, appliance 200 may be implemented as a network device such as Citrix networking (formerly NetScaler®) products sold by Citrix Systems, Inc. of Fort Lauderdale, Fla.

As shown in FIG. 1A, one or more servers 106 may operate as a server farm 38. Servers 106 of server farm 38 may be logically grouped, and may either be geographically co-located (e.g., on premises) or geographically dispersed (e.g., cloud based) from clients 102 and/or other servers 106. In an embodiment, server farm 38 executes one or more applications on behalf of one or more of clients 102 (e.g., as an application server), although other uses are possible, such as a file server, gateway server, proxy server, or other similar server uses. Clients 102 may seek access to hosted applications on servers 106.

As shown in FIG. 1A, in some embodiments, appliances 200 may include, be replaced by, or be in communication with, one or more additional appliances, such as WAN optimization appliances 205(1)-205(n), referred to generally as WAN optimization appliance(s) 205. For example, WAN optimization appliance 205 may accelerate, cache, compress or otherwise optimize or improve performance, operation, flow control, or quality of service of network traffic, such as traffic to and/or from a WAN connection, such as optimizing Wide Area File Services (WAFS), accelerating Server Message Block (SMB) or Common Internet File System (CIFS). In some embodiments, appliance 205 may be a performance enhancing proxy or a WAN optimization controller. In one embodiment, appliance 205 may be implemented as Citrix SD-WAN products sold by Citrix Systems, Inc. of Fort Lauderdale, Fla.

Figure 1B:
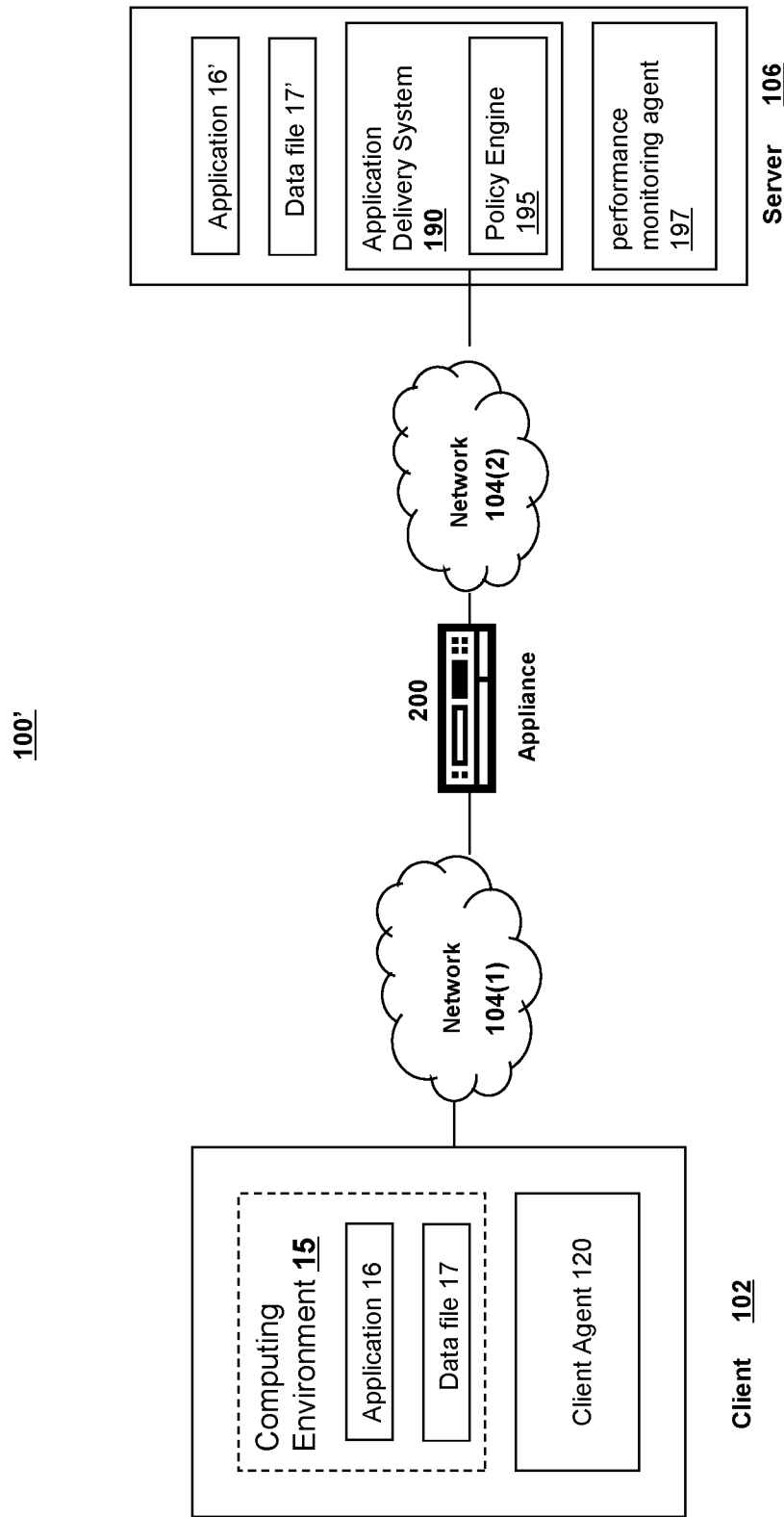
FIG. 1B is a block diagram of a network computing system for delivering a computing environment from a server to a client via an appliance, in accordance with an illustrative embodiment.

Referring to FIG. 1B, an example network environment, 100', for delivering and/or operating a computing network environment on a client 102 is shown. As shown in FIG. 1B, a server 106 may include an application delivery system 190 for delivering a computing environment, application, and/or data files to one or more clients 102. Client 102 may include client agent 120 and computing environment 15. Computing environment 15 may execute or operate an application, 16, that accesses, processes or uses a data file 17. Computing environment 15, application 16 and/or data file 17 may be delivered via appliance 200 and/or the server 106.

Appliance 200 may accelerate delivery of all or a portion of computing environment 15 to a client 102, for example by the application delivery system 190. For example, appliance 200 may accelerate delivery of a streaming application and data file processable by the application from a data center to a remote user location by accelerating transport layer traffic between a client 102 and a server 106. Such acceleration may be provided by one or more techniques, such as: 1) transport layer connection pooling, 2) transport layer connection multiplexing, 3) transport control protocol buffering, 4) compression, 5) caching, or other techniques. Appliance 200 may also provide load balancing of servers 106 to process requests from clients 102, act as a proxy or access server to provide access to the one or more servers 106, provide security and/or act as a firewall between a client 102 and a server 106, provide Domain Name Service (DNS)

resolution, provide one or more virtual servers or virtual internet protocol servers, and/or provide a secure virtual private network (VPN) connection from a client 102 to a server 106, such as a secure socket layer (SSL) VPN connection and/or provide encryption and decryption operations.

Application delivery management system 190 may deliver computing environment 15 to a user (e.g., client 102), remote or otherwise, based on authentication and authorization policies applied by policy engine 195. A remote user may obtain a computing environment and access to server stored applications and data files from any network-connected device (e.g., client 102). For example, appliance 200 may request an application and data file from server 106. In response to the request, application delivery system 190 and/or server 106 may deliver the application and data file to client 102, for example via an application stream to operate in computing environment 15 on client 102, or via a remote-display protocol or otherwise via remote-based or server-based computing. In an embodiment, application delivery system 190 may be implemented as any portion of the Citrix Workspace Suite™ by Citrix Systems, Inc., such as Citrix Virtual Apps and Desktops (formerly XenApp® and XenDesktop®).

Policy engine 195 may control and manage the access to, and execution and delivery of, applications. For example, policy engine 195 may determine the one or more applications a user or client 102 may access and/or how the application should be delivered to the user or client 102, such as a server-based computing, streaming or delivering the application locally to the client 120 for local execution.

For example, in operation, a client 102 may request execution of an application (e.g., application 16') and application delivery system 190 of server 106 determines how to execute application 16', for example based upon credentials received from client 102 and a user policy applied by policy engine 195 associated with the credentials. For example, application delivery system 190 may enable client 102 to receive application-output data generated by execution of the application on a server 106, may enable client 102 to execute the application locally after receiving the application from server 106, or may stream the application via network 104 to client 102. For example, in some embodiments, the application may be a server-based or a remote-based application executed on server 106 on behalf of client 102. Server 106 may display output to client 102 using a thin-client or remote-display protocol, such as the Independent Computing Architecture (ICA) protocol by Citrix Systems, Inc. of Fort Lauderdale, Fla. The application may be any application related to real-time data communications, such as applications for streaming graphics, streaming video and/or audio or other data, delivery of remote desktops or workspaces or hosted services or applications, for example infrastructure as a service (IaaS), desktop as a service (DaaS), workspace as a service (WaaS), software as a service (SaaS) or platform as a service (PaaS).

One or more of servers 106 may include a performance monitoring service or agent 197. In some embodiments, a dedicated one or more servers 106 may be employed to perform performance monitoring. Performance monitoring may be performed using data collection, aggregation, analysis, management and reporting, for example by software, hardware or a combination thereof. Performance monitoring may include one or more agents for performing monitoring, measurement and data collection activities on clients 102 (e.g., client agent 120), servers 106 (e.g., agent 197) or an appliance 200 and/or 205 (agent not shown). In general, monitoring agents (e.g., 120 and/or 197) execute transparently (e.g., in the background) to any application and/or user of the device. In some embodiments, monitoring agent 197 includes any of the product embodiments referred to as Citrix Analytics or Citrix Application Delivery Management by Citrix Systems, Inc. of Fort Lauderdale, Fla.

The monitoring agents 120 and 197 may monitor, measure, collect, and/or analyze data on a predetermined frequency, based upon an occurrence of given event(s), or in real time during operation of network environment 100. The monitoring agents may monitor resource consumption and/or performance of hardware, software, and/or communications resources of clients 102, networks 104, appliances 200 and/or 205, and/or servers 106. For example, network connections such as a transport layer connection, network latency, bandwidth utilization, end-user response times, application usage and performance, session connections to an application, cache usage, memory usage, processor usage, storage usage, database transactions, client and/or server utilization, active users, duration of user activity, application crashes, errors, or hangs, the time required to log-in to an application, a server, or the application delivery system, and/or other performance conditions and metrics may be monitored.

The monitoring agents 120 and 197 may provide application performance management for application delivery system 190. For example, based upon one or more monitored performance conditions or metrics, application delivery system 190 may be dynamically adjusted, for example periodically or in real-time, to optimize application delivery by servers 106 to clients 102 based upon network environment performance and conditions.

In described embodiments, clients 102, servers 106, and appliances 200 and 205 may be deployed as and/or executed on any type and form of computing device, such as any desktop computer, laptop computer, or mobile device capable of communication over at least one network and performing the operations described herein. For example, clients 102, servers 106 and/or appliances 200 and 205 may each correspond to one computer, a plurality of computers, or a network of distributed computers such as computer 101 shown in FIG. 1C.

Figure 1C:
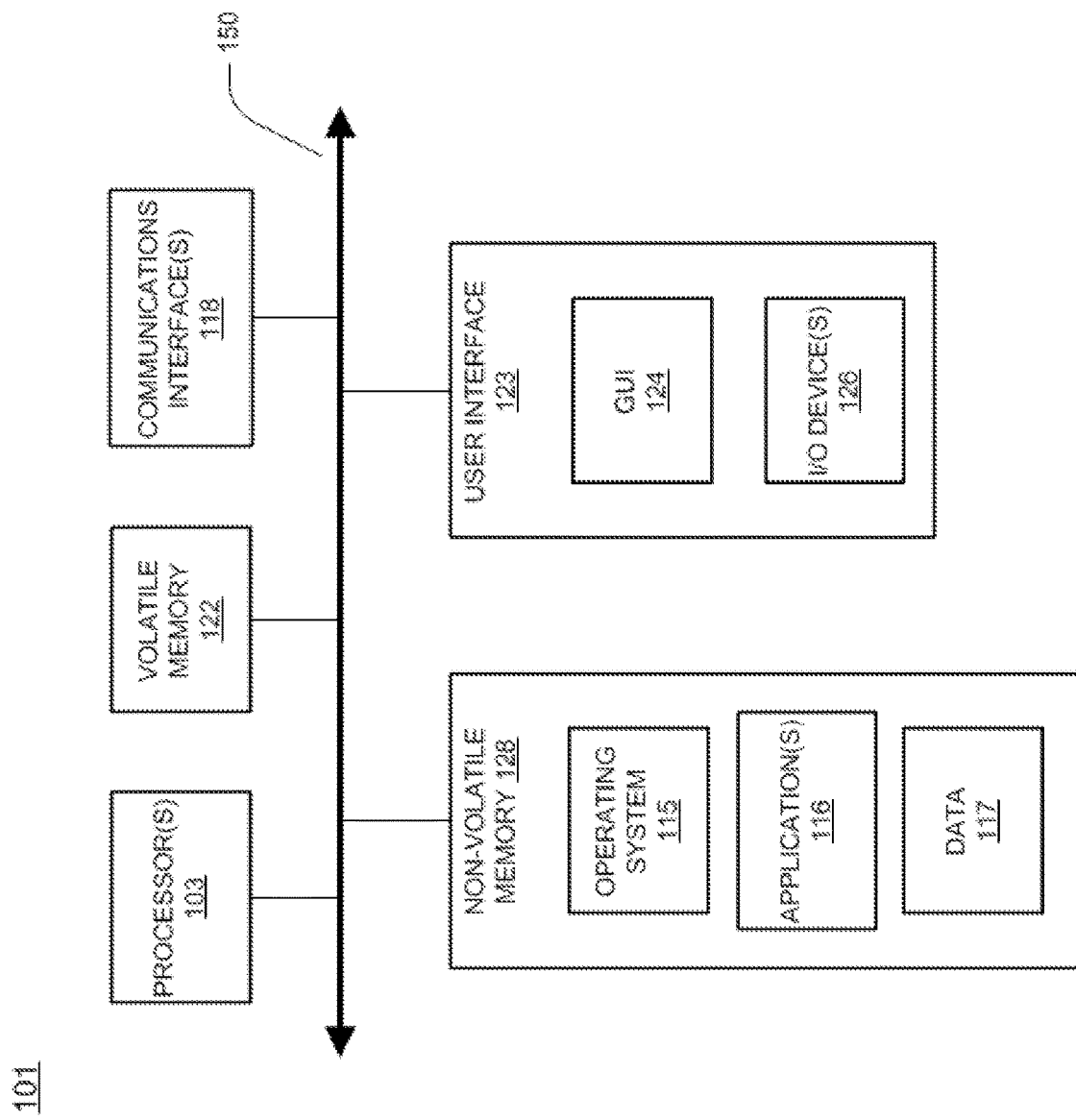
FIG. 1C is a block diagram of a computing device, in accordance with an illustrative embodiment.

As shown in FIG. 1C, computer 101 may include one or more processors 103, volatile memory 122 (e.g., RAM), non-volatile memory 128 (e.g., one or more hard disk drives (HDDs) or other magnetic or optical storage media, one or more solid state drives (SSDs) such as a flash drive or other solid state storage media, one or more hybrid magnetic and solid state drives, and/or one or more virtual storage volumes, such as a cloud storage, or a combination of such physical storage volumes and virtual storage volumes or arrays thereof), user interface (UI) 123, one or more communications interfaces 118, and communication bus 150. User interface 123 may include graphical user interface (GUI) 124 (e.g., a touchscreen, a display, etc.) and one or more input/output (I/O) devices 126 (e.g., a mouse, a keyboard, etc.). Non-volatile memory 128 stores operating system 115, one or more applications 116, and data 117 such that, for example, computer instructions of operating system 115 and/or applications 116 are executed by processor(s) 103 out of volatile memory 122. Data may be entered using an input device of GUI 124 or received from I/O device(s) 126. Various elements of computer 101 may communicate via communication bus 150. Computer 101 as shown in FIG. 1C is shown merely as an example, as clients 102, servers 106 and/or appliances 200 and 205 may be implemented by any computing or processing environment and with any type of machine or set of machines that may have suitable hardware and/or software capable of operating as described herein.

Processor(s) 103 may be implemented by one or more programmable processors executing one or more computer programs to perform the functions of the system. As used herein, the term "processor" describes an electronic circuit that performs a function, an operation, or a sequence of operations. The function, operation, or sequence of operations may be hard coded into the electronic circuit or soft coded by way of instructions held in a memory device. A "processor" may perform the function, operation, or sequence of operations using digital values or using analog signals. In some embodiments, the "processor" can be embodied in one or more application specific integrated circuits (ASICs), microprocessors, digital signal processors, microcontrollers, field programmable gate arrays (FPGAs), programmable logic arrays (PLAs), multi-core processors, or general-purpose computers with associated memory. The "processor" may be analog, digital or mixed-signal. In some embodiments, the "processor" may be one or more physical processors or one or more "virtual" (e.g., remotely located or "cloud") processors.

Communications interfaces 118 may include one or more interfaces to enable computer 101 to access a computer network such as a LAN, a WAN, or the Internet through a variety of wired and/or wireless or cellular connections.

In described embodiments, a first computing device 101 may execute an application on behalf of a user of a client computing device (e.g., a client 102), may execute a virtual machine, which provides an execution session within which applications execute on behalf of a user or a client computing device (e.g., a client 102), such as a hosted desktop session, may execute a terminal services session to provide a hosted desktop environment, or may provide access to a computing environment including one or more of: one or more applications, one or more desktop applications, and one or more desktop sessions in which one or more applications may execute.

Additional details of the implementation and operation of network environment 100, clients 102, servers 106, and appliances 200 and 205 may be as described in U.S. Pat. No. 9,538,345, issued Jan. 3, 2017 to Citrix Systems, Inc. of Fort Lauderdale, Fla., the teachings of which are hereby incorporated herein by reference.

B. Appliance Architecture

Figure 2:
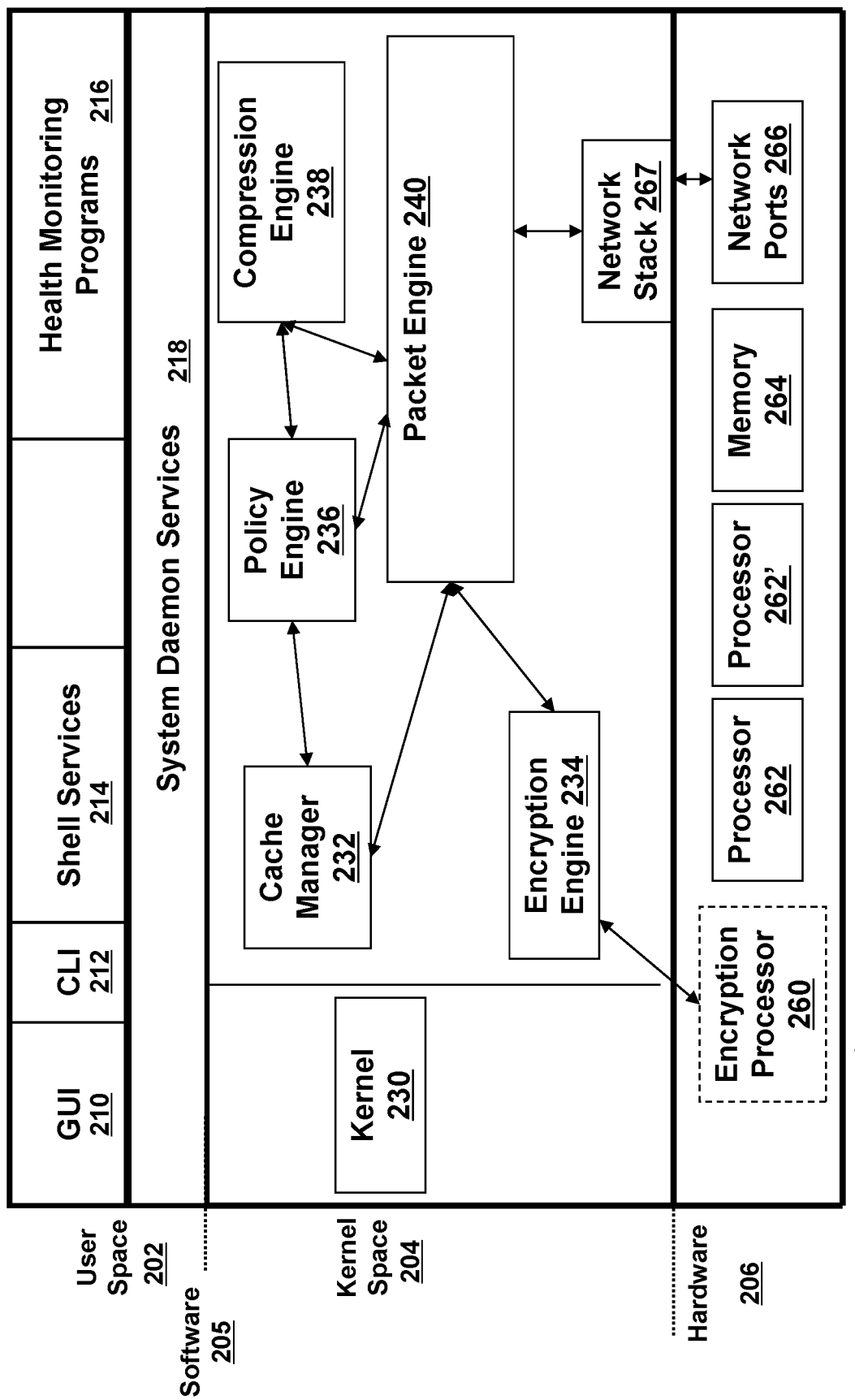
FIG. 2 is a block diagram of an appliance for processing communications between a client and a server, in accordance with an illustrative embodiment.

FIG. 2 shows an example embodiment of appliance 200. As described herein, appliance 200 may be implemented as a server, gateway, router, switch, bridge or other type of computing or network device. As shown in FIG. 2, an embodiment of appliance 200 may include a hardware layer 206 and a software layer 205 divided into a user space 202 and a kernel space 204. Hardware layer 206 provides the hardware elements upon which programs and services within kernel space 204 and user space 202 are executed and allow programs and services within kernel space 204 and user space 202 to communicate data both internally and externally with respect to appliance 200. As shown in FIG. 2, hardware layer 206 may include one or more processing units 262 for executing software programs and services, memory 264 for storing software and data, network ports 266 for transmitting and receiving data over a network, and encryption processor 260 for encrypting and decrypting data such as in relation to Secure Socket Layer (SSL) or Transport Layer Security (TLS) processing of data transmitted and received over the network.

An operating system of appliance 200 allocates, manages, or otherwise segregates the available system memory into kernel space 204 and user space 202. Kernel space 204 is reserved for running kernel 230, including any device drivers, kernel extensions or other kernel related software. As known to those skilled in the art, kernel 230 is the core of the operating system, and provides access, control, and management of resources and hardware-related elements of application 104. Kernel space 204 may also include a number of network services or processes working in conjunction with cache manager 232.

Appliance 200 may include one or more network stacks 267, such as a TCP/IP based stack, for communicating with client(s) 102, server(s) 106, network(s) 104, and/or other appliances 200 or 205. For example, appliance 200 may establish and/or terminate one or more transport layer connections between clients 102 and servers 106. Each network stack 267 may include a buffer 243 for queuing one or more network packets for transmission by appliance 200.

Kernel space 204 may include cache manager 232, packet engine 240, encryption engine 234, policy engine 236 and compression engine 238. In other words, one or more of processes 232, 240, 234, 236 and 238 run in the core address space of the operating system of appliance 200, which may reduce the number of data transactions to and from the memory and/or context switches between kernel mode and user mode, for example since data obtained in kernel mode may not need to be passed or copied to a user process, thread or user level data structure.

Cache manager 232 may duplicate original data stored elsewhere or data previously computed, generated or transmitted to reducing the access time of the data. In some embodiments, the cache memory may be a data object in memory 264 of appliance 200, or may be a physical memory having a faster access time than memory 264.

Policy engine 236 may include a statistical engine or other configuration mechanism to allow a user to identify, specify, define or configure a caching policy and access, control and management of objects, data or content being cached by appliance 200, and define or configure security, network traffic, network access, compression or other functions performed by appliance 200.

Encryption engine 234 may process any security related protocol, such as SSL or TLS. For example, encryption engine 234 may encrypt and decrypt network packets, or any portion thereof, communicated via appliance 200, may setup or establish SSL, TLS or other secure connections, for example between client 102, server 106, and/or other appliances 200 or 205. In some embodiments, encryption engine 234 may use a tunneling protocol to provide a VPN between a client 102 and a server 106. In some embodiments, encryption engine 234 is in communication with encryption processor 260. Compression engine 238 compresses network packets bi-directionally between clients 102 and servers 106 and/or between one or more appliances 200.

Packet engine 240 may manage kernel-level processing of packets received and transmitted by appliance 200 via network stacks 267 to send and receive network packets via network ports 266. Packet engine 240 may operate in conjunction with encryption engine 234, cache manager 232, policy engine 236 and compression engine 238, for example to perform encryption/decryption, traffic management such as request-level content switching and request-level cache redirection, and compression and decompression of data.

User space 202 is a memory area or portion of the operating system used by user mode applications or programs otherwise running in user mode. A user mode application may not access kernel space 204 directly and uses service calls in order to access kernel services. User space 202 may include graphical user interface (GUI) 210, a command line interface (CLI) 212, shell services 214, health monitor 216, and daemon services 218. GUI 210 and CLI 212 enable a system administrator or other user to interact with and control the operation of appliance 200, such as via the operating system of appliance 200. Shell services 214 include the programs, services, tasks, processes or executable instructions to support interaction with appliance 200 by a user via the GUI 210 and/or CLI 212.

Health monitor 216 monitors, checks, reports and ensures that network systems are functioning properly and that users are receiving requested content over a network, for example by monitoring activity of appliance 200. In some embodiments, health monitor 216 intercepts and inspects any network traffic passed via appliance 200. For example, health monitor 216 may interface with one or more of encryption engine 234, cache manager 232, policy engine 236, compression engine 238, packet engine 240, daemon services 218, and shell services 214 to determine a state, status, operating condition, or health of any portion of the appliance 200. Further, health monitor 216 may determine if a program, process, service or task is active and currently running, check status, error or history logs provided by any program, process, service or task to determine any condition, status or error with any portion of appliance 200. Additionally, health monitor 216 may measure and monitor the performance of any application, program, process, service, task or thread executing on appliance 200.

Daemon services 218 are programs that run continuously or in the background and handle periodic service requests received by appliance 200. In some embodiments, a daemon service may forward the requests to other programs or processes, such as another daemon service 218 as appropriate.

As described herein, appliance 200 may relieve servers 106 of much of the processing load caused by repeatedly opening and closing transport layer connections to clients 102 by opening one or more transport layer connections with each server 106 and maintaining these connections to allow repeated data accesses by clients via the Internet (e.g., "connection pooling"). To perform connection pooling, appliance 200 may translate or multiplex communications by modifying sequence numbers and acknowledgment numbers at the transport layer protocol level (e.g., "connection multiplexing"). Appliance 200 may also provide switching or load balancing for communications between the client 102 and server 106.

As described herein, each client 102 may include client agent 120 for establishing and exchanging communications with appliance 200 and/or server 106 via a network 104. Client 102 may have installed and/or execute one or more applications that are in communication with network 104. Client agent 120 may intercept network communications from a network stack used by the one or more applications. For example, client agent 120 may intercept a network communication at any point in a network stack and redirect the network communication to a destination desired, managed or controlled by client agent 120, for example to intercept and redirect a transport layer connection to an IP address and port controlled or managed by client agent 120. Thus, client agent 120 may transparently intercept any protocol layer below the transport layer, such as the network layer, and any protocol layer above the transport layer, such as the session, presentation or application layers. Client agent 120 can interface with the transport layer to secure, optimize, accelerate, route or load-balance any communications provided via any protocol carried by the transport layer.

In some embodiments, client agent 120 is implemented as an Independent Computing Architecture (ICA) client developed by Citrix Systems, Inc. of Fort Lauderdale, Fla. Client agent 120 may perform acceleration, streaming, monitoring, and/or other operations. For example, client agent 120 may accelerate streaming an application from a server 106 to a client 102. Client agent 120 may also perform end-point detection/scanning and collect end-point information about client 102 for appliance 200 and/or server 106. Appliance 200 and/or server 106 may use the collected information to determine and provide access, authentication and authorization control of the client's connection to network 104. For example, client agent 120 may identify and determine one or more client-side attributes, such as: the operating system and/or a version of an operating system, a service pack of the operating system, a running service, a running process, a file, presence or versions of various applications of the client, such as antivirus, firewall, security, and/or other software.

Additional details of the implementation and operation of appliance 200 may be as described in U.S. Pat. No. 9,538,345, issued Jan. 3, 2017 to Citrix Systems, Inc. of Fort Lauderdale, Fla., the teachings of which are hereby incorporated herein by reference.

C. Systems and Methods for Protecting Confidential Information

Certain scenarios may involve providing sensitive, private, or confidential information to another entity, such as a customer representative. For example, an owner of the confidential information may be asked to provide the confidential information (e.g., a social security number (SSN), a date of birth (DoB) and/or other confidential information) to the customer representative for verification purposes. Responsive to obtaining the information, the customer representative can confirm/verify/validate the confidential information by using/referencing a page (e.g., a web page, a web application, a software as a service (SaaS) application window/page, and/or other pages). For example, the customer representative can confirm/verify the SSN of the owner (or other confidential information) by comparing the SSN provided by the owner to the SSN specified by a web page. FIG. 3, for instance, illustrates an example embodiment of a page 304 (e.g., a web page) disclosing information of the owner for a certain account. The page 304 may include/display/render the confidential information 306 of the owner, such as a name (e.g., username), e-mail, identification number, SSN, and/or enrollment status. A customer representative may have access to the page 304 (e.g., using a client 102), thereby having access to the confidential information 306 of the owner. The confidential information 306 (e.g., SSN) can be visible to the customer representative accessing the page 304, which can pose an insider threat. In another example, an attacker impersonating an information technology (IT) helpdesk representative may contact the owner of the confidential information 306 to obtain such information (e.g., a password (or other information) to access a personal account/resource/service). Failing to provide adequate protective mechanisms for the confidential information 306 can unintentionally increase the accessibility of the confidential information 306. Increased accessibility to the confidential information 306 can cause the confidential information 306 to be mishandled/misused by another entity, such as the customer representative and/or the attacker.

The systems and methods presented herein include a novel approach for preventing/precluding another entity (e.g., the customer representative) from accessing/viewing/retrieving/misusing the confidential information 306 (e.g., SSN, DoB, and/or other information). For example, the novel approach may prevent/preclude the entity from viewing the confidential information 306 via a page 304, such as the page 304 illustrated in FIG. 3. The novel approach may obfuscate/obscure/morph/transform the confidential information 306 of the page 304. Responsive to obfuscating the confidential information 306, the entity may be unable to view/access the confidential information 306 of the page 304. In some embodiments, the systems and methods presented herein may enable verification/confirmation/authentication of the confidential information 306 (e.g., verification by the owner) without exposing/providing/specifying/indicating/sharing the confidential information 306 of the owner to another entity (e.g., the customer representative).

The present disclosure is directed towards systems and methods for protecting private data or confidential information. The systems and methods described herein can transform/morph/modify/alter/obfuscate/hide confidential information 306 (e.g., a social security number (SSN), a date of birth (DoB) and/or other confidential/sensitive/private information) included in a page 304 (e.g., a web page, a web application, a software as a service (SaaS) application, and/or other pages) to protect/secure the confidential information 306. For instance, a user of a client 102 (e.g., a smartphone, a laptop, a tablet device, a desktop computer of a user, and/or a client supporting HTTP/HTTPS) may have access to confidential information 306 included in a page 304 of a server 106 (e.g., a backend server supporting hypertext transfer protocol (HTTP) and/or hypertext transfer protocol secure (HTTPS) protocol). However, in some embodiments, the user of the client 102 (or page 304) may not be an owner of the confidential information 306.

To protect/secure the confidential information 306, a device 702 (e.g., a gateway module, a local/foreign node, and/or an application delivery controller (ADC)) intermediary between the client 102 and the server 106 may transform/modify/obfuscate/remove the confidential information 306 of the page 304. Responsive to transforming/obfuscating the confidential information 306, the device 702 may cause or trigger a request to the owner of the confidential information (e.g., via an out-of-band verification process and/or other processes). The request may include a request to verify/confirm/authenticate the confidential information 306. For example, the device 702 may send/transmit/initiate a one-time verification message (e.g., request to verify the confidential information) to the owner of the confidential information 306. If the owner receives/obtains the one-time verification message, the owner may confirm/authenticate/verify the confidential information 306. By transforming/obfuscating the confidential information 306 of the page 304, the systems and methods described herein can protect the confidential information 306 (e.g., included in the page 304) from being misused while enabling verification/confirmation/authentication of the confidential information 306 (e.g., by the owner of the confidential information 306).

In some embodiments, an administrator of a device 702 (e.g., an ADC) may configure/enable/specify one or more modification rules (e.g., verification transformation rules) for a page 304 (e.g., web page and/or web application) in the device 702. The one or more modification rules may be used/applied to determine/establish/identify that at least one first user interface (UI) element has (or may render) the confidential information 306 in the page 304. According to the one or more modification rules, the first UI element(s) of the page 304 may be transformed/replaced/obfuscated by at least one second UI element (e.g., a "verify" button, an "activate" button, and/or other elements). The device 702 may use the one or more modification rules to transform/replace/change the at least one first UI element with/into the at least one second UI element, thereby obfuscating/hiding/protecting the confidential information 306 in the page 304. In some embodiments, the one or more modification rules may configure/establish/specify/indicate a verification process (e.g., out-of-band verification process) that triggers/causes the verification/confirmation/authentication of the confidential information 306. For example, the one or more modification rules may configure/specify an out-of-band verification process that requests the owner to verify the confidential information 306. An activation of the second UI element (e.g., a "verify" button) may cause/trigger/launch/enable the out-of-band verification process (or other verification processes).

In some embodiments, a user (e.g., a customer representative) may trigger/use a client 102 (e.g., having a web browser) to request/access/view/use a page 304 (e.g., a web page) from the server 106. The page 304 from the server 106 may include confidential information 306 (e.g., private account information, such as a password or SSN) to be verified with an owner of the confidential information 306. Responsive to the trigger of the client 102 by the user, the device 702 may receive/obtain/intercept a request from the client 102 for the page 304. The request may include or correspond to a request to access/use/view/display/render the page 304 via the client 102. The device 702 may use the one or more modification rules (e.g., verification transformation rules) to verify/analyze/process the request and/or the page 304 (e.g., to identify that first UI element(s) of the requested page 304 includes confidential information 306). Responsive to analyzing the request and/or the page 304, the device 702 may replace/transform the first UI element(s) of the page 304 with the second UI element(s). The first UI element(s) may have the confidential information 306 of the page 304.

Referring to FIG. 4, depicted is a page 304 of one example embodiment, wherein a first UI element of the page 304 having the confidential information 306 (e.g., SSN or other information) can be replaced (e.g., according to the one or more modification rules) by a second UI element 308(2), such as a "Verify Account SSN" button (or other elements). The device 702 may obfuscate the confidential information 306 by replacing the first UI element of the page 304 with the second UI element 308(2). Once the device 702 obfuscates/transforms the confidential information 306, the device 702 may provide the page 304 with the obfuscated/hidden confidential information 306 to the user via the client 102 for rendering. By obfuscating the confidential information 306, the device 702 may prevent the client 102, and therefore the user, from accessing/viewing/using the confidential information 306 of the owner.

In some embodiments, the user of the client 102 (e.g., the customer representative) may (e.g., be instructed/requested to) activate/enable the second UI element 308(2). For example, the user may activate/enable/click the "Verify Account SSN" button (or a generic "Verify information" widget, or other elements) of the page 304 (e.g., the page 304 rendered/displayed on the client 102). The activation of the second UI element 308(2) may cause/trigger/launch the execution of the verification process (e.g., out-of-band verification process) configured by the administrator of the device 702. For example, the device 702 may receive/obtain the activation of the second UI element (e.g., the "Verify Account SSN" button) to request the owner to verify the confidential information 306. Responsive to receiving the activation of the second UI element, the device 702 may initiate the verification process by sending/transmitting/initiating a request to the owner to verify the confidential information 306 (e.g., wherein in some embodiments, the user may not be even aware which specific confidential information 306 is being verified by the owner). For example, the owner may receive a message, notification, call, and/or prompt to provide/specify/indicate the confidential information 306 (e.g., last four digits of the SSN), as shown in FIG. 5. The example embodiment depicted in FIG. 5 illustrates a message/notification/prompt received by the owner to verify/provide the confidential information 306. Responsive to receiving the message, the owner may participate in the verification process (e.g., out-of-band process configured by the administrator of the device 702) by providing/specifying/indicating the confidential information 306 (e.g., last four digits of the SSN) via the message.

In some embodiments, the device 702 and/or the server 106 may receive/obtain the confidential information 306 provided by the owner (e.g., provided via the message). Responsive to receiving the confidential information 306 from the owner, the device 702 and/or the server 106 may confirm/validate/authenticate the confidential information 306 (e.g., using stored/predetermined/configured information of the owner in the server 106 or device 702). Once the server 106 or the device 702 verifies/confirms the confidential information 306 provided by the owner, the device 702 may send/transmit/direct an update to the page 304 to the client 102 (e.g., to the user of the client 102, such as the customer representative). The update to the page 304 may include or correspond to a page 304 with an indication of whether the confidential information 306 has been correctly verified with the owner.

Figure 6:
FIG. 6 is a depiction of a page with an indication of whether confidential information has been correctly verified, in accordance with an illustrative embodiment.

Referring to FIG. 6, depicted is an updated page 304 of one example embodiment, wherein the updated page 304 includes an indication of whether the confidential information 306 has been correctly verified with the owner. For example, the device 702 and/or the server 106 may confirm that the confidential information 306 provided by the owner is correct/accurate. Responsive to the confirmation of the confidential information 306, the device 702 may send to the client 102 an updated page, such as the one illustrated in FIG. 6. The client 102 may render/display the updated page 304 with the indication (e.g., "Verification successful" indication) that the confidential information 306 has been correctly verified with the owner. The indication may be rendered as an update to the second UI element, or as a UI element separate from the second UI element. Therefore, the confidential information 306 can be verified/confirmed/authenticated without providing/indicating/specifying/exposing the confidential information 306 to the user of the client 102 (e.g., the customer representative).

In some embodiments, an administrator of a device 702 (e.g., an ADC) may configure/enable/specify one or more modification rules (e.g., verification transformation rules) for a page 304 (e.g., web page and/or web application) in the device 702. The one or more modification rules may be used to determine/establish/identify one or more first UI elements (e.g., one or more hypertext markup language (HTML) elements that include or has information associated with the confidential information 306 (e.g., last four digits of a SSN) and/or the field/type of the confidential information 306 (e.g., a SSN). The device 702 may use the one or more modification rules to identify/determine whether the page 304 includes/specifies/indicates one or more first UI elements (e.g. confidential information 306 specified by the one or more modification rules). For example, the device 702 may use the one or more modification rules to parse the page for a SSN field (or other first UI elements/confidential information 306). Therefore, a device 702 may identify/detect/determine whether at least one SSN field (or other first UI elements) is included in a page 304.

Responsive to identifying the first UI element(s) specified by the one or more modification rules, the device 702 may obfuscate/hide/change/transform/remove the first UI element(s) of the page 304, and/or the confidential information 306 on the page 304. For example, the device 702 may use the one or more modification rules (e.g., verification transformation rules) to transform/obfuscate the identified first UI element(s) of the page 304 using/into one or more second UI elements (e.g., a "verify" button). The first UI element(s) to be transformed/replaced (e.g., specified by the one or more modification rules) can be based on elements (e.g., regex matching SSN label/value) in a server response of the requested page 304. In one example, an "Account SSN" of a page 304 may correspond to the name of the label, while "SSN" may correspond to the value. In some embodiments, the administrator may configure one or more UI element attributes in the one or more modification rules, such as an identification (id), class, path, and/or other attributes. The device 702 may use the element attribute(s) to identify/detect the first UI element(s) in a page 304 (e.g., that includes the confidential information 306 in the page 304). In some embodiments, the device 702 may use an output of a data loss prevention (DLP) system and/or an internet content adaptation protocol (ICAP) to determine that the page 304 includes the confidential information 306 (e.g., the first UI element(s) having the confidential information 306). For example, the device 702 can use the DLP output (e.g., of a Web-DLP Adapter) to identify at least one first UI element having the confidential information 306.

In some embodiments, a DLP system such as a Web-DLP Adapter may identify and/or output information about an identifiable user interface element that has the confidential information 306. The Web-DLP Adapter may for instance identify one or more rules for a web response from the server, and may apply the one or more rules to the web response to match with and identify an interface element in the web response that has the confidential information 306.

In some embodiments, the administrator may configure/specify/establish a verification process (e.g., an out-of-band verification process) using the one or more modification rules, for example. The verification process may establish/define/configure one or more actions to be performed responsive to an activation of a second UI element 308(2) by a client 102 (e.g., by a customer representative using a client 102). For example, a device 702 may initiate one or more actions responsive to receiving/obtaining the activation of the second UI element 308(2). The one or more actions may include initiating/sending a one-time verification message to the owner (e.g., one-time verification uniform resource locator (URL)), a push notification to the owner (e.g., push notification to a workspace), a representational state transfer (REST) call to a verification service, a prompt to the owner/client to select a method to verify the confidential information, and/or other actions configured by the administrator/organization. For instance, a prompt to the client can allow a customer representative using the client to ask the owner (via an ongoing phone call) to select a method to verify the confidential information. In some embodiments, a prompt may be sent via a default mechanism (e.g., a push notification) directly to the owner with one or more options to select other methods (e.g., potentially more secure/trusted methods), or to proceed with verifying the confidential information via the current/default mechanism, for instance. In certain embodiments, the REST call to the verification service may cause a verification and/or a webhook callback (or other processes) to obtain the result of the verification.

In some embodiments, the verification process can be used to verify/confirm confidential information 306 of an owner (e.g., an employee) within an organization. For example, an IT helpdesk representative may use the verification process to confirm confidential information 306 of an employee (or other owners), such as a badge identification (ID) of the employee. The IT helpdesk representative may activate a second UI element 308(2) (e.g., a "verify" button/ widget) of a page 304 to request the employee (or other owners) to verify the confidential information 306. By activating the second UI element 308(2), the verification process (e.g., an out-of-band verification process) may cause/trigger/initiate/send a notification/message/prompt to a workspace application (e.g., Citrix Workspace Suite™ by Citrix Systems, Inc.). The workspace application may include or correspond to a workspace environment and/or other applications of the employee. The notification/message may include or correspond to a request for the owner/ employee to verify the confidential information 306.

Responsive to receiving the notification/message/prompt via the workspace, the employee may provide/specify/indicate the confidential information 306 (e.g., the badge ID of the employee) via the message/notification. An out-of-band entity, the device 702 and/or the server 106 may execute/ complete/perform the verification process to confirm/verify whether the confidential information 306 provided by the employee (or other owners) is correct/accurate. If the confidential information 306 is correct/accurate, the device 702 may send a message/prompt/notification to a client 102 (e.g., a client 102 used by the IT helpdesk representative). The message/prompt/notification may specify/indicate that the confidential information 306 has been correctly verified with the employee (or other owners). Based on or responsive to the message/prompt/notification, the IT helpdesk representative may confirm/know that the confidential information 306 has been verified, without accessing/viewing the confidential information 306 of the employee. In some embodiments, the verification process (e.g., out-of-band verification process) may prevent mishandling/misuse of the confidential information 306 through a vishing attack. For example, the verification process may prevent a vishing attacker from sending/transmitting a message/notification/prompt to an owner (e.g., an employee of an organization) via a workspace.

Figure 7:
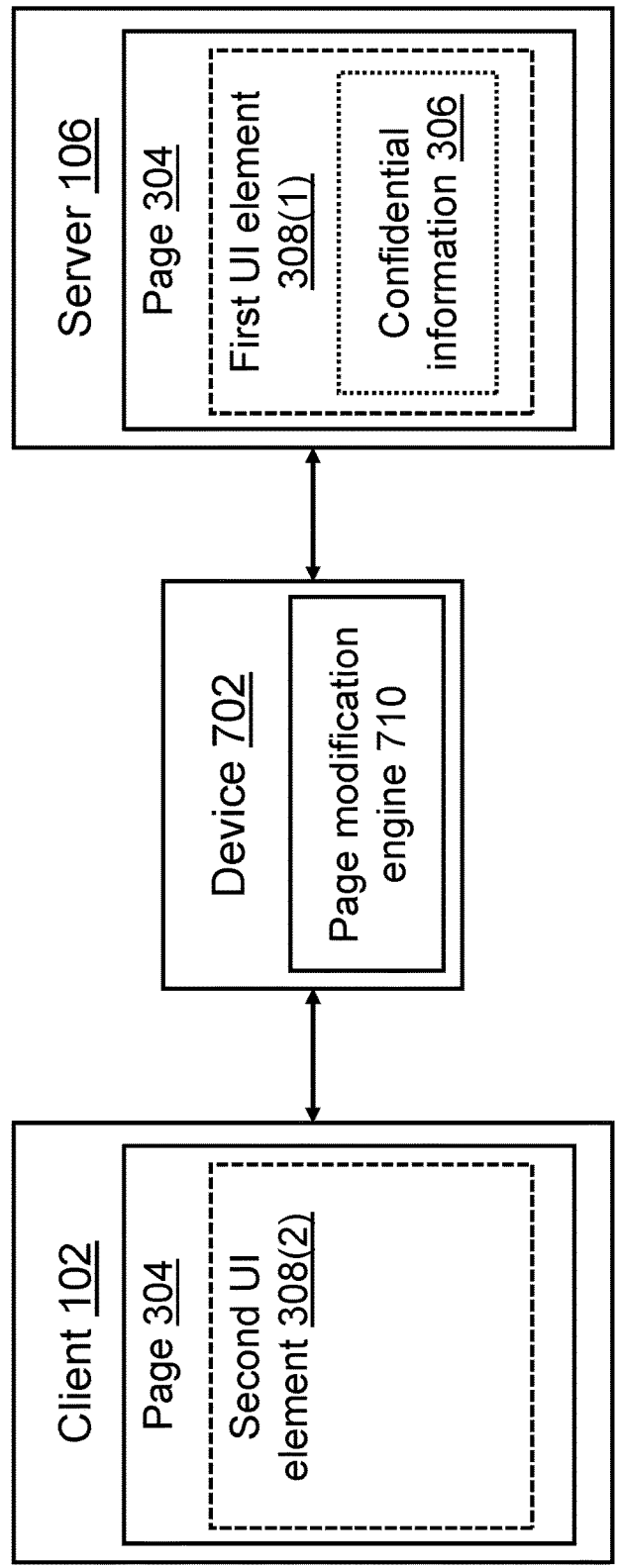
FIG. 7 is a block diagram of a system for protecting confidential information, in accordance with an illustrative embodiment.

Referring to FIG. 7, depicted is a block diagram of one example embodiment of a system 700 for protecting private data or confidential information 306, e.g., to prevent confidential information 306 from misuse or mishandling. The system 700 may include one or more clients 102 of an entity, one or more devices 702, and/or one or more servers 106 hosting one or more pages 304. The one or more pages 304 can include or maintain or have access to one or more UI elements 308 and/or confidential information 306. The device 702 can include or maintain or have access to a page modification engine 710.

Each of the above-mentioned elements or entities is implemented in hardware, or a combination of hardware and software, in one or more embodiments. Each component of the system 700 may be implemented using hardware or a combination of hardware or software detailed above in connection with FIG. 1C. For instance, each of these elements or entities can include any application, program, library, script, task, service, process or any type and form of executable instructions executing on hardware of a client device 102, a server 106 and/or a network device 200 in connection with FIGS. 1B-1C, for instance. The hardware includes circuitry such as one or more processors in one or more embodiments.

The system 700 may include one or more servers 106. The server 106 (e.g., a backend server supporting HTTPS messages or transactions, and/or other servers 106) may be configured and/or designed to host one or more resources (e.g., one or more URLs) and/or pages 304 (e.g., web pages and/or application resources, such as a web application, SaaS application or remote-hosted network application). The server 106 may be configured and/or designed to provision the one or more pages 304 to one or more clients 102 of a consumer or other entity (e.g., an organization or user), via one or more networks 104. For example, the client 102 may establish one or more sessions or connections (e.g., secured or otherwise, such as a SSL virtual private network connection) with the server(s) 106 to access a page 304, such as a SaaS application page. In another example, the server(s) 106 may receive/obtain a request from the client 102 (e.g., via a device 702) for a page 304. The page 304 may include confidential information 306 to be verified with an owner of the confidential information 306. In some embodiments, the request received by the server 106 may be initiated/caused/ triggered by a user of the client 102, such as a customer representative. The request received by the server 106 may be initiated to verify the confidential information 306 with the owner during a communication session (e.g., a communication session between the user of the client 102 and the owner of the confidential information 306).

Responsive to receiving the request(s) (e.g., from the client(s) 102 via the device 702), the server(s) 106 may send/transmit/broadcast a response to the device 702. The server(s) 106 may provide/indicate/specify access to the page 304 (or other information) via the response. For example, the response from the server(s) 106 may indicate/ include access to the page 304 for display to the user of the client 102. In some embodiments, the server(s) 106 can be part of a cloud or datacenter for instance. The server(s) 106 may include any embodiment of volatile memory 122 or non-volatile memory 128 (discussed in FIG. 1C for example) which may store files, data and/or content of the service. The server(s) 106 may communicate with other various components of the system 700 in FIG. 7 via a communications interface 118 for instance. Hence, the server(s) 106 may be similar in some aspects to the computer 101 described with reference to FIG. 1C.

To provide a page 304 (e.g., a web page), the server(s) 106 may execute, provide, provision, and/or host one or more network application(s). In some embodiments, a page 304 may be referred to interchangeably with (an interface/ window/output of) an application, application resource or network application. A network application can for instance include a remote-hosted application, a remote-hosted desktop, a web application or a software-as-a-service (SaaS) application. A remote-hosted desktop may be a virtual desktop hosted on the server 106 which is accessed by or remotely provisioned to the client 102. In some embodiments, the delivery of a remote-hosted desktop may be via a session and/or connection based on High-Definition User Experience (HDX) or Independent Computing Architecture (ICA) display remoting protocol, or Remote Desktop Protocol (RDP). A remote-hosted application may include/correspond to an application service that can be delivered via a HDX-based, ICA-based, RDP-based, etc., session and/or connection. In some embodiments, a remote-hosted application may be an application which is installed on/in the remote-hosted desktop environment and is therefore accessible within the remote-hosted desktop. A SaaS application can be a centrally-hosted application which is typically accessible on a subscription basis. In some embodiments, the SaaS applications may include web-based applications. In other embodiments, the SaaS applications may correspond to remote-hosted applications and, therefore, can be delivered in HDX/ICA/RDP-based sessions and/or connections. SaaS applications and/or web applications may include for instance salesforce.com, SAP, Microsoft Office 365, Dropbox or Gmail service, Amazon web services, and so on.

In some embodiments, the server 106 and/or client 102 can include or host, among other elements, one or more pages 304. The one or more pages 304 can include or maintain or provide one or more UI elements 308. The one or more UI elements 308 may be configured and/or designed to include/provide confidential information 306 in the page 304. In some embodiments, the one or more UI elements 308 may include or correspond to one or more HTML, elements. In some embodiments, the one or more UI elements 308 may comprise one or more first UI elements 308(1). The first UI element 308(1) may include a field, type, value, and/or other attributes of the confidential information 306. For example, the first UI element 308(1) may include a field and/or value of the confidential information 306, wherein the field may correspond to "SSN" and/or the value includes the last four digits of the SSN. In some embodiments, the field, type, value and/or other attributes of the first UI element 308(1) may be stored/maintained in the device 702 and/or a secure store. In some embodiments, the first UI element(s) 308(1) can be used/parsed/analyzed to determine whether the page 304 from the server 106 includes the confidential information 306. For example, an administrator may configure/generate one or more modification rules in a device 702. The one or more modification rules may be used to determine/identify one or more first UI elements 308(1) having confidential information 306. Therefore, the device 702 may use the one or more modification rules to determine whether the page 304 from the server 106 includes the confidential information 306.

In some embodiments, one or more second UI elements 308(2) can be used to replace/change/displace/transform/obfuscate one or more first UI elements 308(1). For example, the device 702 may replace a first UI element 308(1) in a page 304 with a second UI element 308(2). Therefore, the second UI elements 308(2) can be used to hide/obfuscate/remove the confidential information 306 in the page 304. The second UI element(s) 308(2) may include or correspond to a "verify" button and/or other buttons/widgets. For example, the device 702 may identify one or more first UI elements 308(1) having the confidential information 306 (e.g., a SSN) in the page 304. The device 702 may transform/replace the detected first UI element(s) 308 (1) (e.g., the value of the detected element(s)) with one or more UI buttons/widgets, such as a "verify" button and/or other second UI elements 308(2).

The second UI element(s) 308(2) may comprise a button or widget that can be activated by the user of the client 102. For instance, a user of the client 102 may activate/enable one or more second UI elements 308(2). In another example, a customer representative may click a "verify" button of a page 304 rendered by the client 102, thereby activating/enabling the second UI element 308(2). The activation of the second UI element 308(2) may be sent to the device 702 from the client 102. For instance, responsive to an activation of the second UI element 308(2), the device 702 may receive/obtain an HTTP POST message (or other messages) with an identification and/or class of the second UI element 308(2) from the client 102. In some embodiments, the activation of the second UI element 308(2) may trigger/cause/initiate a verification process (e.g., an out-of-band verification) of the confidential information 306 by the owner.

In some embodiments, the one or more pages 304 can include or maintain confidential information 306. The one or more UI elements 308 included in the server 106 may include or provide the confidential information 306. The confidential information 306 in the server 106 may include sensitive or private information of an owner, such as a SSN, a password for an account, a DoB, and/or other information. In some embodiments, a client 102 may initiate/send/transmit a request to verify the confidential information 306 with the owner of the confidential information 306. The owner of the confidential information 306 may provide/verify/confirm the confidential information 306 (e.g., via an out-of-band verification process and/or other processes). In some embodiments, the confidential information 306 (e.g., a SSN, a DoB, and/or information of a personal user account) may be included/specified/indicated in a page 304, such as in one or more first UI elements 308(1) of the page 304. The confidential information 306 and/or a type of the confidential information can be prevented from being exposed or presented to a user of the client 102 (e.g., by obfuscating the confidential information 306 using one or more second UI elements 308(2)). In some embodiments, the confidential information 306 may be stored/secured by a device 702 using private and/or public encryption methods, for instance. The confidential information may be stored or retained by the device 702 (e.g., in a storage device/location accessible by the device 702), for the duration of a session (e.g., a call or online chat) between the user of the client (e.g., customer representative) and the owner for instance. In some embodiments, when the session ends or is terminated, the confidential information may be purged/removed/erased by the device 702.

The system 700 may include one or more clients 102. The client 102 may include or correspond to devices of a consumer of the service. For example, if the consumer is an individual or user, the client 102 may comprise a smartphone, a laptop (e.g., at home), a tablet device, and a desktop computer (e.g., at work), that the user may use to access an application resource (e.g., Dropbox service) and/or other resources/pages at various times and/or locations for instance. In an example where the consumer is an organization, such as an enterprise, the consumer can extend over a number of users (e.g., management persons, staff members, IT administrators, and so on) and their associated client(s) 102 or devices (e.g., corporate-issued device, personally-owned devices, and/or registered/approved devices (e.g., in a BYOD program)). Any number of the users may access a service/resource (e.g., salesforce.com, SAP, Microsoft Office 365) from a service/resource provider, via a corporate account for the service/resource for instance.

The client 102 may be configured and/or designed to display, and/or render one or more pages 304 (e.g., to a user of the client 102). In some embodiments, the client 102 may communicate with the server(s) 106 via a device 702 (e.g., a device 702 intermediary between the client 102 and the server(s) 106). For example, the client 102 may send a request and/or message (e.g. a HTTP message and/or other messages) to the server(s) 106 via the device 702. A user of the client 102 (e.g., a customer representative) may initiate/send/trigger the request in/during (or currently with) a communication session with the owner of the confidential information 306. In some embodiments, the request may include or correspond to a request for the page 304 from the server 106 (e.g., a page 304 hosted by the server 106). Responsive to sending the request/message, the client 102 may receive/obtain a response from the server 106 via the device 702 (e.g., an ADC and/or other devices). The response from the server 106 may specify/provide access to the page 304 (e.g., for display/use to the user of the client 102) and/or other information.

In some embodiments, the client 102 may render/display a page 304 served by the server 106. The first element 308(1) in the page 304 (e.g., the confidential information 306) displayed by the client 102 may be replaced/transformed by the device 702 with a second UI element 308(2) (e.g., a "verify" button/widget), prior to rendering at the client 102. Therefore, the client 102 may render/display the page 304 after the confidential information 306 has been replaced/transformed/obfuscated from the page 304. In some embodiments, a user of the client 102 (e.g., a customer representative) may activate/enable the second UI element 308(2) in the page 304 displayed by the client 102. For example, the user of the client 102 may activate the second UI element(s) 308(2) by clicking/selecting a "verify" button (or other second UI elements 308(2)) in the page 304 rendered by the client 102, to initiate a verification process with the owner of the confidential information 306. In some embodiments, the client 102 may receive/obtain an update to the page 304 from the device 702. The update to the page 304 may include an indication of whether the confidential information 306 has been correctly verified with the owner. For example, responsive to a correct verification of the confidential information 306, the client 102 may display/render an updated page 304 with a "verification successful" button/widget (or other UI buttons). The "verification successful" button displayed by the client 102 may indicate/specify that the confidential information 306 has been correctly verified (e.g., by the owner).

The system 700 may include one or more devices 702 (sometimes referred to as appliance(s) 200, gateway(s) 200, node(s), and/or application delivery controllers). A device 702 may be configured and/or designed to serve as an intermediary between different elements of a computer and/or network environment, such as between client(s) 102, server(s) 106, network(s) 104, and/or other devices 702 (e.g., as discussed above in connection with FIG. 2). The device 702 may be located at various points or in various communication paths, for example between two networks 104, within a computing and/or network environment 100. In other embodiments, the device 702 may be located on a network 104. One or more devices 702 may communicate with one another and/or work in conjunction to, for example, accelerate, protect and/or secure network traffic between clients 102 and servers 106 and/or provide load balancing of servers 106 to process requests from clients 102. In some embodiments, the one or more devices 702 may act as a proxy or access server to provide access to the one or more servers 106, provide security and/or act as a firewall between the client 102 and the server 106, and/or provide a secure VPN connection from the client 102 to the server 106, such as a SSL VPN connection and/or provide encryption and decryption operations.

In some embodiments, the device 702 may receive/obtain/intercept a request from the client 102. The request may be initiated in order to verify confidential information 306 (e.g., a SSN, a password, and/or other confidential information) with the owner of the confidential information 306 in a communication session. In some embodiments, the request may include or correspond to a request for a page 304 hosted by the server 106. The device 702 may send/transmit/forward the request for the page 304 to the server 106. In some embodiments, the device 702 may receive/obtain a response to the request from the server 106. The response from the server 106 may specify/provide access to the page 304 and/or other information. Responsive to receiving/obtaining/accessing the page 304, the device 702 may determine/identify/detect confidential information 306 in the page 304. For example, the device 702 may determine that the page 304 includes a SSN and/or password of the owner. In some embodiments, the device 702 may determine whether the page 304 includes confidential information 306 according to at least one of: an application of at least one rule (e.g., regular expression matching and/or other rules), an identification of the first element(s) 308(1) (e.g., UI element attributes, such as id/class/path), and/or an output of a DLP system.

In some embodiments, the device 702 can include, among other elements, a page modification engine 710. The page modification engine 710 included in the device 702 may be configured and/or designed to replace or transform one or more UI elements 308 in a page 304. The page modification engine 710 may be configured and/or designed to access, control and/or manage objects, data or content being cached by the device 702. The page modification engine 710 can be located within, outside, or adjacent to the device 702. The page modification engine 710 may comprise one or more programs or services that are executable on hardware of the page modification engine 710.

In some embodiments, the page modification engine 710 may use one or more modification rules configured by an administrator (or other users) of the device 702. The page modification engine 710 (or other components of the device 702) may use the one or more modification rules to determine whether a page 304 includes at least one first UI element 308(1) and/or the confidential information 306. The first UI element(s) 308(1) may have/include the confidential information 306 in the page 304. The page modification engine 710 may store/maintain one or more attributes (e.g., a value, type, field, or path) of the detected first UI element(s) 308(1) in the device 702. For example, the page modification engine 710 may store a value and/or field of the identified first UI element(s) 308(1) (e.g., store the confidential information 306) in a cache (or other memory) accessible to the device 702.

In some embodiments, the page modification engine 710 may be configured to replace/change a detected/identified first UI element 308(1) in the page 304 with a second UI element 308(2). The second UI element 308(2) may comprise a button or widget that can be activated by the user of the client 102. For example, the second UI element(s) 308(2) may include or correspond to a "verify" button and/or other buttons/widgets. In one example, the page modification engine 710 may identify one or more first UI elements 308(1) having the confidential information 306 (e.g., a password) in the page 304. The page modification engine 710 may transform/replace/change the detected first UI element(s) 308(1) (e.g., the value of the first UI element(s) 308(1), such as the last four digits of a SSN) with one or more UI buttons/widgets, such as a "verify" button and/or other second UI elements 308(2). The page modification engine 710 may configure the "verify" button (or other second UI elements 308(2)) to be activated by a user of the client 102 (e.g., the customer representative). By transforming/replacing the first UI element(s) 308(1) in the page 304, the page modification engine 710 may obfuscate/obscure/hide the confidential information 306 in the page 304. In some embodiments, the page modification engine 710 may add/incorporate another UI element (e.g., a third UI element) to the page 304. The another UI element may be added in addition to the obfuscated element and/or on top of the second UI element 308(2) itself.

Responsive to the replacement of the first UI element 308(1) with the second UI element 308(2), the device 702 may send/transmit the page 304 with the second UI element 308(2) (e.g., after obfuscating the confidential information 306) to the client 102. A user of the client 102 may activate/enable the second UI element 308(2) of the page 304. The activation of the second UI element 308(2) may indicate/specify an attempt/intent to verify/confirm/authenticate the confidential information 306 with the owner. For example, a customer representative (or other users) may click the "verify" button of the page 304 rendered by the client 102, thereby activating/enabling the second UI element 308(2). The activation of the second UI element 308(2) may indicate an attempt/intent to verify/confirm the confidential information 306 included in the first UI element 308(1) that was replaced with the second UI element 308(2). In some embodiments, the device 702 may receive/obtain/intercept a message indicating the activation of the second UI element 308(2) from the client 102. If the device 702 receives the message indicating the activation of the second UI element 308(2), the device 702 may initiate (e.g., via a verification process/mechanism) a one-time verification message to the owner, a push notification to the owner, a REST call to a verification service, and/or a prompt to the owner/client 102 to select a method to verify the confidential information 306. The device 702 and/or the a verification process/mechanism may request the owner to verify the confidential information 306, by sending the message/notification.

In some embodiments, the device 702 may receive/obtain a verification response (e.g., with the confidential information 306) from the owner (e.g., via a message, prompt, call, and/or notification). The device 702 can maintain/store confidential information 306 from the page 304 (e.g., extracted from the first UI element 308(1)). The device 702 may compare the stored confidential information 306 with the confidential information 306 obtained from the owner in the verification response. In some embodiments, an out-of-band verification process may compare the confidential information 306 from the page 306 with the confidential information 306 obtained from the owner. For example, an out-of-band entity (e.g., server/service/device) may receive/obtain the verification response with the confidential information 306 from the owner. The out-of-band entity may compare the received confidential information 306 with the confidential information 306 (or other attributes) from the page 304. In some embodiments, the out-of-band entity may send/transmit the result of the comparing to the device 702. Responsive to receiving the result of the comparing, the device 702 (e.g., the page modification engine 710) may update the page 304. According to the comparing, the device 702 (and/or out-of-band verification process) may determine whether the confidential information 306 has been correctly verified with the owner. Responsive to the determination, the page modification engine 710, for instance, may update/modify the page 304. For example, the page modification engine 710 may update the page 304 to include an indication of whether the confidential information 306 has been correctly verified with the owner (e.g., a "verification successful" button/widget). The device 702 may send/transmit the updated page 304 to the client 102. Therefore, the user of the client 102 may confirm/authenticate/verify the confidential information 306 of the owner without accessing/viewing the confidential information 306.

Figure 8:
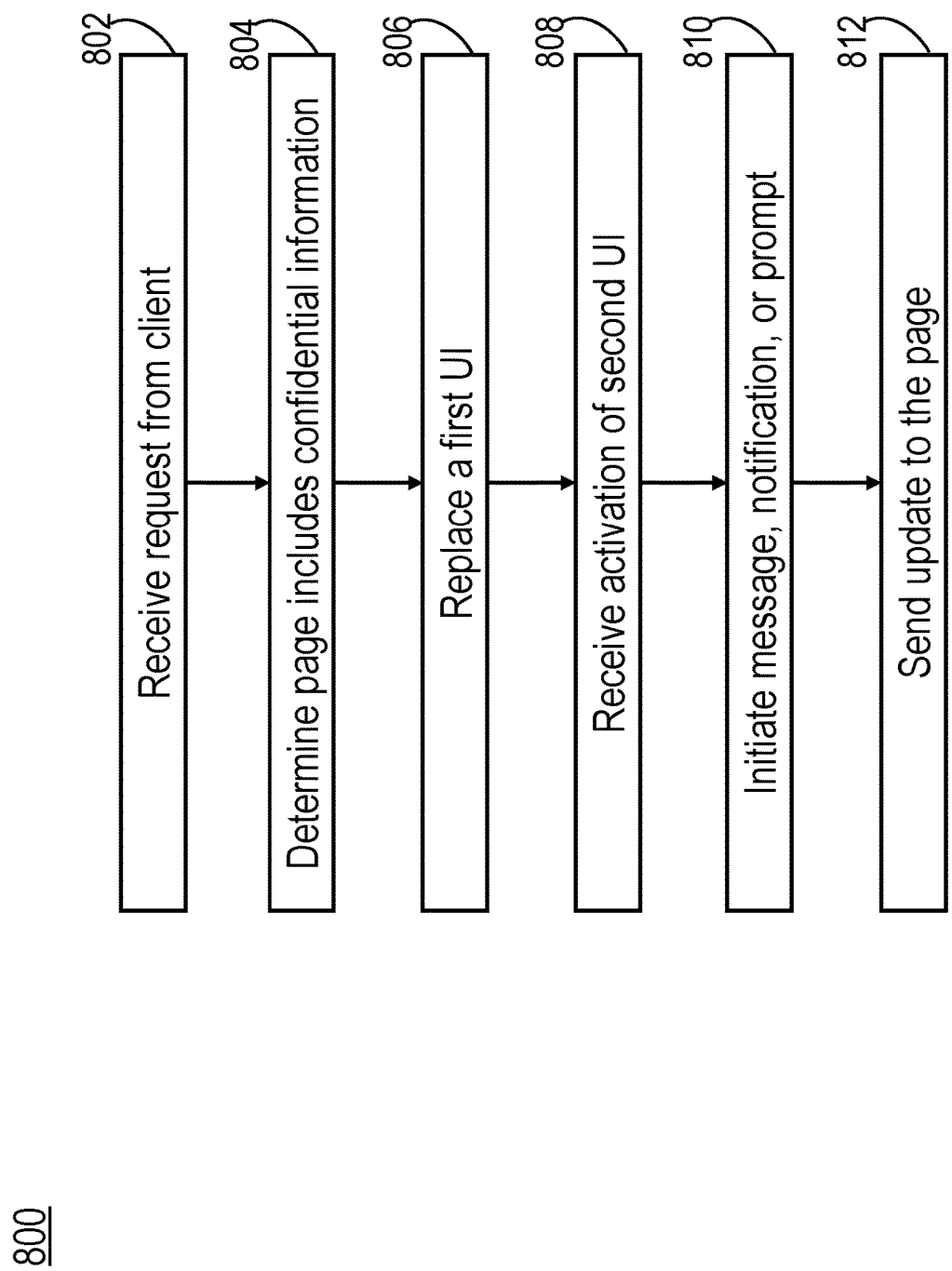
FIG. 8 is a flow diagram of an example method for protecting confidential information, in accordance with an illustrative embodiment.

Referring to FIG. 8, depicted is a flow diagram of one embodiment of a method for protecting private data or confidential information 306. The functionalities of the method may be implemented using, or performed by, the components detailed herein in connection with FIGS. 1-7. In brief overview, a device 702 may receive a request from a client 102 (802). The device 702 may determine a page 304 includes confidential information 306 (804). The device 702 may replace a first UI element 308(1) with a second UI element 308(2) (806). The device 702 may receive an activation of the second UI element 308(2) (808). The device 702 may initiate a message, notification, call, and/or prompt to the client 102 to select a method, for example (810). The user (e.g., customer representative) may then ask the owner (e.g., over a call) to select/choose a method. In some embodiments, the device 702 may receive verification information (or a result of a verification/confirmation) from the owner via the selected method. In some embodiments, the device 702 may compare the verification information obtained from the owner with stored confidential information 306 to determine whether the confidential information 306 has been correctly verified. The device 702 may send an update to the page 304 to include an indication of whether the confidential information 306 has been correctly verified (812).

Referring now to operation (802), and in some embodiments, a device 702 (e.g., an appliance or ADC) may receive/obtain/intercept a request from a client 102, wherein the device 702 may be intermediary between the client 102 and the server 106. In some embodiments, a user of the client 102 may initiate the request during/in (or concurrently with) a communication session with the owner of confidential information 306. In some embodiments, a user of the client 102 (e.g., a customer representative) may launch/initiate/trigger a page request (e.g., for the owner's information) at the client 102 (e.g., via a browser). For example, the user may launch a web application, a SaaS application and/or other clients 102, and may attempt to browse/visit a page 304 from the server 106 using the web/SaaS application (or other clients 102). The device 702 may receive/obtain/intercept the page request from the client 102. In some embodiments, the page request may be initiated in order to verify confidential information 306 with the owner of the confidential information 306 in a communication session. In some embodiments, the page request may include or correspond to a request for the page 304 from the server 106 (e.g., a page 304 hosted/maintained by the server 106). The device 702 may send/transmit/forward/direct the request for the page 304 to the server 106. If the server 106 receives the page request from the client 102 via the device 702, the device 702 may receive a response/output to the request from the server 106. The response from the server 106 may include the page 304 or provide access to the page 304 (e.g., for display to and use by the user at the client 102) and/or other information.

Referring now to operation (804), and in some embodiments, the device 702 may determine that the page 304 includes confidential information 306. In one example, the device 702 may receive/access/intercept the page 304 (or other information) via the response from the server 106. The page 304 may include/specify confidential information 306 (e.g., a SSN, a DoB, and/or information of a personal user account). In some embodiments, the confidential information 306 are to be verified/confirmed/authenticated with an owner of the confidential information 306. Responsive to receiving the page 304, the device 702 may determine whether the page 304 from the server 106 includes confidential information 306. The device 702 may determine whether the page 304 includes confidential information 306 according to at least one of: an application of at least one rule (e.g., regular expression matching and/or other rules), an identification of the first element(s) 308(1) (e.g., UI element attributes, such as id/class/path), and/or an output of a DLP system.

In one example, the device 702 may use one or more modification rules (e.g., configured by an administrator of the device 702) to identify/detect at least one first UI element 308(1) in the page 304 (e.g., to determine whether the page 304 includes confidential information 306). The first UI element(s) 308(1) may have/include the confidential information 306 in the page 304. For each identified first UI element 308(1), the device 702 may store/maintain a label (or other information) associated with the identified element. The device 702 may store/maintain a value, label and/or attributes of the first UI element(s) 308(1) (e.g., one or more HTML, elements) in the device 702 and/or in a secure store (e.g., associated to a communication session). The device 702 may store/maintain/secure the value of the detected first UI element(s) 308(1) (e.g., the confidential information 306) using private/public encryption methods, for example. In some embodiments, the device 702 may associate the label of the identified first UI element(s) 308(1) (e.g., a SSN) to the value of the identified first UI element(s) 308(1) (e.g., the last four digits of the SSN). The device 702 may store/maintain the association/relationship between the label of the identified first UI element(s) 308(1) and the value of the identified first UI element(s) 308(1). In some embodiments, the device 702 and/or the server 106 may use the association/relationship to identify/determine the confidential information 306 to be verified/confirmed/authenticated with the owner.

Referring now to operation (806), and in some embodiments, the device 702 may replace/change/displace a first UI element 308(1) with a second UI element 308(2). Responsive to identifying/detecting one or more first UI elements 308(1) of a page 304 (e.g., according to one or more modification rules), the device 702 may replace/transform the first UI element(s) 308(1) with/into one or more second UI elements 308(2). The second UI element(s) 308(2) may include or correspond to a "verify" button and/or other buttons/widgets. For example, the device 702 may identify one or more first UI elements 308(1) having the confidential information 306 (e.g., a SSN) in the page 304. The device 702 may transform/replace the detected first UI element(s) 308(1) (e.g., the value of the detected element(s)) with one or more UI buttons/widgets, such as a "verify" button and/or other second UI elements 308(2). The device 702 may generate/configure a random unique id and/or class for the UI button(s). The UI button (e.g., "verify" button) may replace the first UI element 308(1) (e.g., HTML element) in the page 304. A user of the client 102 may use/click/activate the UI button to trigger/cause/initiate a verification process (e.g., to verify the confidential information 306 with the owner).

In some embodiments, the device 702 may send/transmit the page 304 with the second UI element 308(2) to the client 102. The page 304 may be for display to a user of the client 102 (e.g., a customer representative). The second UI element 308(2) may comprise a button or widget (e.g., the UI button) that can be activated by the user of the client 102. In some embodiments, the device 702 may replace the first UI element 308(1) with the second UI element 308(2) prior to providing the page 304 to the client 102 for rendering/displaying. By replacing the first UI element 308(1) with the second UI element 308(2), the device 702 may obfuscate/hide/obscure the confidential information 306 prior to providing the page 304 to the client 102. In some embodiments, the confidential information 306 and/or a type of the confidential information 306 can be prevented from being exposed or presented to a user of the client 102 (e.g., by obfuscating the confidential information 306 prior to providing a page 304 to the client 102). In some embodiments, the device 702 may add/incorporate another UI element (e.g., a third UI element) to the page 304. The another UI element may be added in addition to the obfuscated element and/or on top of the second UI element 308(2) itself. Responsive to replacing the first UI element 308(1) with the second UI element 308(2), the device 702 may send/transmit/provide the page 304 with the obfuscated confidential information 306 to the client 102.

Prior to providing the page 304 to the client 102 for display, the device 702 may replace/change/displace one or more third UI elements with one or more fourth UI elements (e.g., a second "verify" button). The third UI element may have additional confidential information 306 in the page 304, such as a password or personal identifier. By replacing the third UI element with the fourth UI element, the device 702 may obfuscate/hide/obscure the additional confidential information 306 (e.g., obfuscate from a user of client 102). In some embodiments, the device 702 may receive/obtain an activation of the fourth UI element from the client 102. The activation of the fourth UI element may initiate a request to the owner to verify the additional confidential information 306. In some embodiments, the device 702 may send/transmit/provide an update to the page 304 to the client 102. The update to the page 304 may include an indication of whether the additional confidential information 306 has been correctly verified with the owner.

Referring now to operation (808), and in some embodiments, the device 702 may receive/obtain an activation of the second UI element 308(2) from the client 102. Prior to the activation of the second UI element 308(2), the client 102 may receive the page 304 with the obfuscated confidential information 306. Because the confidential information 306 is obfuscated, the user of the client 102 (e.g., a customer representative) may be prevented from accessing/viewing the confidential information 306. For example, a client 102 used by a customer representative may receive a page 304 with obfuscated confidential information 306. Instead of providing/specifying a value of a SSN, for instance, the page 304 may include/provide a "verify" button and/or other second UI elements 308(2). Responsive to receiving/obtaining the page 304 with the second UI element 308(2) (e.g., the obfuscated information), the user of the client 102 may enable/activate the second UI element 308(2). For example, the customer representative may click the "verify" button of the page 304 rendered by the client 102, thereby activating/enabling the second UI element 308(2). An activation of the second UI element 308(2) may trigger/cause/initiate a verification process (e.g., an out-of-band verification) of the confidential information 306 by the owner. The initiated verification process, for example, may prompt/request the user of the client 102 (e.g., the customer representative) for contact information of the owner of the confidential information 306, such as a phone number. After the second UI element 308(2) is activated, the client 102 may send/transmit the activation of the second UI element 308(2) to the device 702. For instance, the device 702 may receive/obtain an HTTP POST message (or other messages) with the identification (id) and/or class of the second UI element 308(2) (e.g., the UI button), including a phone number (or other contact information) of the owner.

Referring now to operation (810), and in some embodiments, the device 702 may initiate a message, notification, call, and/or prompt. Responsive to receiving the activation of the second UI element 308(2), the device 702 may initiate a one-time verification message to the owner, a push notification to the owner, a REST call to a verification service, and/or a prompt to the owner/client to select a method to verify the confidential information 306 (e.g., select between a phone call and/or message to a client 102). By initiating the message/notification/call/prompt, the device 702 may request the owner to verify the confidential information 306. In one example, the device 702 may receive/intercept the activation of the "verify" button/widget (or other second UI elements 308(2)). Responsive to receiving the activation of the "verify" button, the device 702 may identify/determine/extract the stored id, class and/or label of the activated button/widget. The device 702 may generate/configure a one-time verification URL for instance. The one-time verification URL may include a form dynamically generated with HTML inputs to verify the confidential information 306 obfuscated by the "verify" button (or other second UI elements 308(2)). The device 702 may incorporate/add/include the one-time verification URL in a message/notification (e.g., a short message service (SMS) message and/or other messages). The device 702 may initiate/send/transmit/direct/route the message/notification (e.g., to the owner and/or a verification service) to verify the confidential information 306 by the owner. Responsive to receiving the message/notification, the owner may activate/select the one-time verification URL to provide/verify/confirm the confidential information 306.

Referring now to operation (812), and in some embodiments, the device 702 may send/transmit an update to the page 304. For example, the owner of the confidential information 306 may provide/verify/confirm the confidential information 306 (e.g., via an out-of-band verification process and/or other processes). In some embodiments, the device 702 can maintain/store the confidential information 306 from the page 304. The device 702 may receive/obtain the confidential information 306 provided by the owner and/or retrieve the stored value of the confidential information 306 (e.g., stored in the device 702 and/or a secure store). The device 702 may compare the stored confidential information 306 with verification information obtained from the owner. According to the comparing, the device 702 may determine whether the confidential information 306 has been correctly verified with the owner. The device 702 may send/transmit to the client 102 an update to the page 304. The update to the page 304 may include an indication of whether the confidential information 306 has been correctly verified with the owner (e.g., via the addition of a "verification successful" button/widget). In some embodiments, the device 702 may send/transmit a message to the client 102. The message may include or correspond to a message to update the second UI element 308(2) or another element of the page 304 to include the indication of whether the confidential information 306 has been correctly verified with the owner.

Various elements, which are described herein in the context of one or more embodiments, may be provided separately or in any suitable subcombination. For example, the processes described herein may be implemented in hardware, software, or a combination thereof. Further, the processes described herein are not limited to the specific embodiments described. For example, the processes described herein are not limited to the specific processing order described herein and, rather, process blocks may be re-ordered, combined, removed, or performed in parallel or in serial, as necessary, to achieve the results set forth herein.

It should be understood that the systems described above may provide multiple ones of any or each of those components and these components may be provided on either a standalone machine or, in some embodiments, on multiple machines in a distributed system. The systems and methods described above may be implemented as a method, apparatus or article of manufacture using programming and/or engineering techniques to produce software, firmware, hardware, or any combination thereof. In addition, the systems and methods described above may be provided as one or more computer-readable programs embodied on or in one or more articles of manufacture. The term "article of manufacture" as used herein is intended to encompass code or logic accessible from and embedded in one or more computer-readable devices, firmware, programmable logic, memory devices (e.g., EEPROMs, ROMs, PROMs, RAMs, SRAMs, etc.), hardware (e.g., integrated circuit chip, Field Programmable Gate Array (FPGA), Application Specific Integrated Circuit (ASIC), etc.), electronic devices, a computer readable non-volatile storage unit (e.g., CD-ROM, USB Flash memory, hard disk drive, etc.). The article of manufacture may be accessible from a file server providing access to the computer-readable programs via a network transmission line, wireless transmission media, signals propagating through space, radio waves, infrared signals, etc. The article of manufacture may be a flash memory card or a magnetic tape. The article of manufacture includes hardware logic as well as software or programmable code embedded in a computer readable medium that is executed by a processor. In general, the computer-readable programs may be implemented in any programming language, such as LISP, PERL, C, C++, C#, PROLOG, or in any byte code language such as JAVA. The software programs may be stored on or in one or more articles of manufacture as object code.

While various embodiments of the methods and systems have been described, these embodiments are illustrative and in no way limit the scope of the described methods or systems. Those having skill in the relevant art can effect changes to form and details of the described methods and systems without departing from the broadest scope of the described methods and systems. Thus, the scope of the methods and systems described herein should not be limited by any of the illustrative embodiments and should be defined in accordance with the accompanying claims and their equivalents.

I claim:

1. A method comprising:
   receiving, by a device intermediary between a client and a server, a request from the client for a page from the server that includes confidential information to be verified with an owner of the confidential information;

replacing, by the device prior to providing the page to the client for rendering, a first user interface (UI) element having the confidential information in the page, with a second UI element to obfuscate the confidential information;

receiving, by the device from the client, an activation of the second UI element to request the owner to verify the confidential information;

sending, by the device to the client, an update to the page to include an indication of whether the confidential information has been correctly verified with the owner; and sending, by the device to the client, a message to update the second UI element or another element of the page to include the indication of whether the confidential information has been correctly verified with the owner.

2. The method of claim 1, wherein the request is initiated by a user of the client in a communication session with the owner, the request initiated to verify the confidential information with the owner in the communication session.

3. The method of claim 1, comprising:
determining, by the device, that the page from the server includes the confidential information, according to at least one of:
application of at least one rule,
identification of the first UI element, or
an output of a data loss prevention (DLP) system.

4. The method of claim 1, comprising:
storing, by the device, the confidential information from the page; and
comparing, by the device, the stored confidential information with verification information obtained from the owner; and
determining, by the device according to the comparing, whether the confidential information has been correctly verified with the owner.

5. The method of claim 1, comprising:
sending, by the device to the client, the page with the second UI element for display to a user of the client, wherein the second UI element comprises a button or widget that can be activated by the user of the client.

6. The method of claim 1, comprising:
initiating, by the device responsive to receiving the activation of the second UI element:
a one-time verification message to the owner,
a push notification to the owner,
a representational state transfer (REST) call to a verification service, or
a prompt to the client or the owner to select a method to verify the confidential information.

7. The method of claim 1, comprising:
replacing, by the device prior to providing the page to the client for display, a third UI element having additional confidential information in the page, with a fourth UI element to obfuscate the additional confidential information;
receiving, by the device from the client, an activation of the fourth UI element to request the owner to verify the additional confidential information; and
sending, by the device to the client, an update to the page to include an indication of whether the additional confidential information has been correctly verified with the owner.

8. The method of claim 1, wherein at least one of: the confidential information, or a type of the confidential information, is prevented from being exposed or presented to a user of the client.

9. A device, comprising:
at least one processor located intermediate between a client and a server, the at least one processor configured to:
receive a request from the client for a page from the server that includes confidential information to be verified with an owner of the confidential information;
replace, prior to providing the page to the client for rendering, a first user interface (UI) element having the confidential information in the page, with a second UI element to obfuscate the confidential information;
receive from the client, an activation of the second UI element to request the owner to verify the confidential information;
send, to the client, an update to the page to include an indication of whether the confidential information has been correctly verified with the owner; and
send, to the client, a message to update the second UI element or another element of the page to include the indication of whether the confidential information has been correctly verified with the owner.

10. The device of claim 9, wherein the request is initiated by a user of the client in a communication session with the owner, the request initiated to verify the confidential information with the owner in the communication session.

11. The device of claim 9, wherein the at least one processor is configured to:
determine that the page from the server includes the confidential information, according to at least one of:
application of at least one rule,
identification of the first UI element, or
an output of a data loss prevention (DLP) system.

12. The device of claim 9, wherein the at least one processor is configured to:
store the confidential information from the page; and
compare the stored confidential information with verification information obtained from the owner; and
determine, according to the comparing, whether the confidential information has been correctly verified with the owner.

13. The device of claim 9, wherein the at least one processor is configured to:
send, to the client, the page with the second UI element for display to a user of the client, wherein the second UI element comprises a button or widget that can be activated by the user of the client.

14. The device of claim 9, wherein the at least one processor is configured to:
initiate, responsive to receiving the activation of the second UI element:
a one-time verification message to the owner,
a push notification to the owner,
a representational state transfer (REST) call to a verification service, or
a prompt to the client or the owner to select a method to verify the confidential information.

15. The device of claim 9, wherein the at least one processor is configured to:
replace, prior to providing the page to the client for rendering, a third UI element having additional confidential information in the page, with a fourth UI element to obfuscate the additional confidential information;

receive, from the client, an activation of the fourth UI element to request the owner to verify the additional confidential information; and send, to the client, an update to the page to include an indication of whether the additional confidential information has been correctly verified with the owner.

16. The device of claim 9, wherein at least one of: the confidential information, or a type of the confidential information, is prevented from being exposed or presented to a user of the client.

17. A non-transitory computer readable medium storing program instructions for causing at least one processor of a device intermediary between a client and a server, to:

receive a request from the client for a page from the server that includes confidential information to be verified with an owner of the confidential information;

replace, prior to providing the page to the client for rendering, a first user interface (UI) element having the confidential information in the page, with a second UI element to obfuscate the confidential information;

receive from the client, an activation of the second UI element to request the owner to verify the confidential information;

send, to the client, an update to the page to include an indication of whether the confidential information has been correctly verified with the owner; and send, to the client, a message to update the second UI element or another element of the page to include the indication of whether the confidential information has been correctly verified with the owner.

18. The non-transitory computer readable medium of claim 17, wherein the program instructions cause the at least one processor to:

initiate, responsive to receiving the activation of the second UI element:
  a one-time verification message to the owner,
  a push notification to the owner,
  a representational state transfer (REST) call to a verification service, or
  a prompt to the client or the owner to select a method to verify the confidential information.

* * * * *